United States Patent [19]
Kuratomi et al.

[11] Patent Number: 5,990,853
[45] Date of Patent: Nov. 23, 1999

[54] PROJECTION TYPE IMAGE DISPLAYING APPARATUS

[75] Inventors: Yasunori Kuratomi, Suita; Akio Takimoto; Koji Akiyama, both of Neyagawa; Hiroshi Tsutsui, Yawata; Toshikatsu Kawakami, Osaka; Yasuaki Muto, Toyonaka; Hiroshi Miyai, Takarazuka, all of Japan

[73] Assignee: Matsushita Electric Industrial Co., Ltd., Osaka, Japan

[21] Appl. No.: 08/875,198

[22] PCT Filed: Oct. 28, 1996

[86] PCT No.: PCT/JP96/03140

§ 371 Date: Nov. 17, 1997

§ 102(e) Date: Nov. 17, 1997

[87] PCT Pub. No.: WO97/15862

PCT Pub. Date: May 1, 1997

[30] Foreign Application Priority Data

Oct. 27, 1995 [JP] Japan .................................. 7-280319

[51] Int. Cl.⁶ ...................................................... G02F 1/135
[52] U.S. Cl. ............................ 345/48; 345/84; 348/744; 348/756; 349/24; 349/25
[58] Field of Search ................................. 345/48, 84, 87; 348/744, 756; 349/24, 25; 359/443

[56] References Cited

U.S. PATENT DOCUMENTS

| | | |
|---|---|---|
| 4,538,884 | 9/1985 | Masaki ..................................... 350/361 |
| 5,235,437 | 8/1993 | Katagiri et al. . |
| 5,327,263 | 7/1994 | Katagiri et al. . |
| 5,384,649 | 1/1995 | Takimoto et al. ......................... 349/25 |
| 5,416,621 | 5/1995 | Tanaka et al. ............................ 349/25 |
| 5,436,742 | 7/1995 | Tanaka et al. ............................ 349/25 |
| 5,612,798 | 3/1997 | Tuli .......................................... 349/24 |
| 5,847,778 | 12/1998 | Muto et al. ............................... 349/25 |

FOREIGN PATENT DOCUMENTS

| | | |
|---|---|---|
| 0 402 944 A2 | 12/1990 | European Pat. Off. . |
| 0 527 609 A1 | 2/1993 | European Pat. Off. . |
| 1-211719 | 8/1989 | Japan . |
| 2-150526 | 6/1990 | Japan . |
| 4-181226 | 6/1992 | Japan . |
| 5-333368 | 12/1993 | Japan . |
| 6-59275 | 3/1994 | Japan . |

OTHER PUBLICATIONS

"Analysis of Charge–Controlled Gray Scale in Ferroelectric Liquid Crystal Optically Addressed Spatial Light Modulator", Yukio Tanaka et al., vol. 33 (19944) pp. 3469–3477.
"Video–Rate Photoaddressed Ferroelectric LC Light Valve with Gray Scale", Matthew Bone et al., pp. 254–256.

Primary Examiner—Bipin H. Shalwala
Assistant Examiner—Vincent E. Kovalick
Attorney, Agent, or Firm—Wenderoth, Lind & Ponack, L.L.P.

[57] ABSTRACT

The present invention relates to a projection type image displaying apparatus capable of displaying larger picture images which are bright, uniform and after-image-free.

A projection type image displaying apparatus, comprising a OASLM (1) for grasping an photoconductive layer (4), a light reflection layer (5) and a light modulating layer (6) by two glass substrates (2, 2') with conductive transparent electrodes (3, 3') each being provided on it, an image source (8) for displaying inputting images on the OASLM (1) by a time serial scanning operation, a driving signal generating means (40) for supplying to the OASLM (1) a driving signal synchronized with the vertical synchronous frequency of the image,
wherein at least either of two conductive transparent electrodes (3, 3') is divided into a plurality of regions, a driving signal to be generated from the driving signal generating means (40) is composed of a plurality of signals different in phase, a signal to be fed respectively to a region adjacent to the divided conductive transparent electrodes (3) has a phase difference approximately equal to time where the vertical effective scanning period is divided by the number of the region.

27 Claims, 20 Drawing Sheets

Fig.7
(a) DRIVER VOLTAGE WAVEFORM
FOR nTH REGION
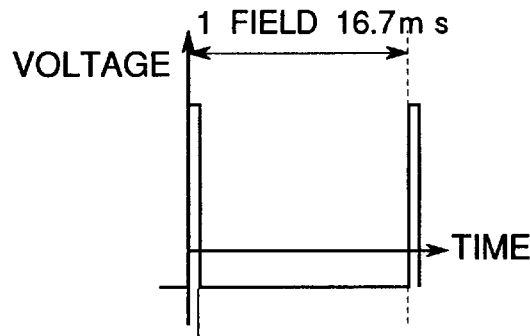
(b) STORING LIGHT
INTENSITY
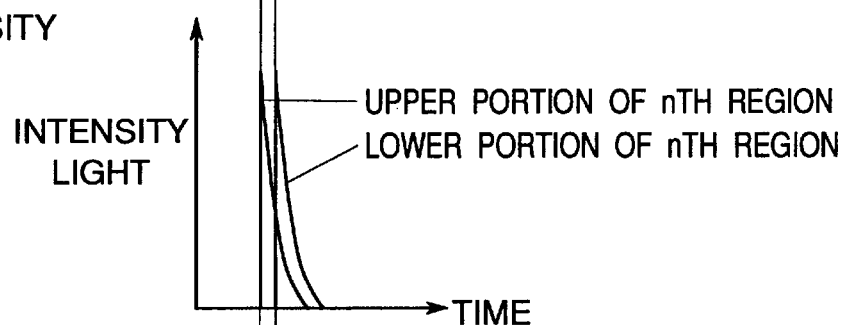
(c) OUTPUT OF
SPACE LIGHT MOD.
ELEMENT
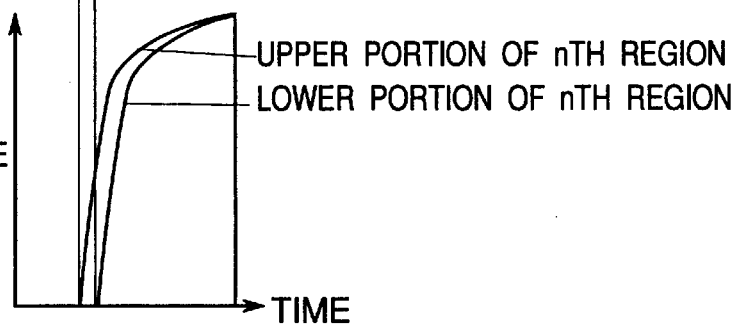

Fig.8
(a) DRIVER VOLTAGE WAVEFORM FOR nTH REGION
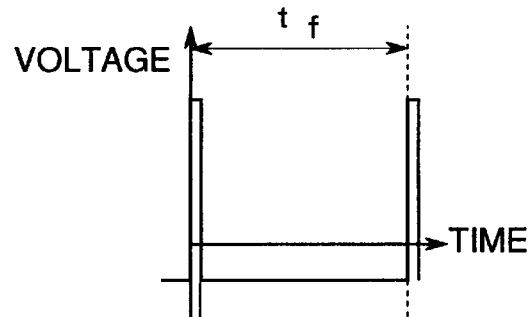
(b) STORING LIGHT INTENSITY
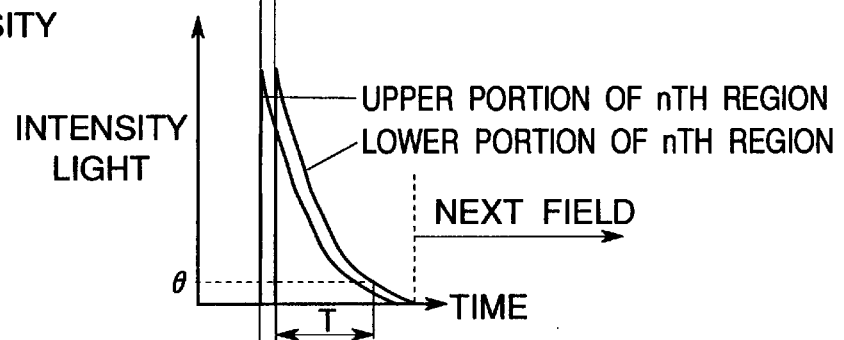
(c) OUTPUT OF SPACE LIGHT MOD. ELEMENT
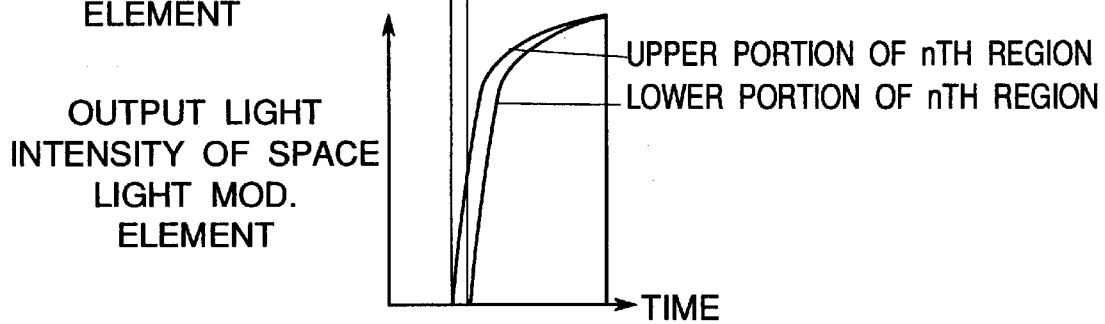

Fig.22
(a) DRIVING SIGNAL WAVEFORM
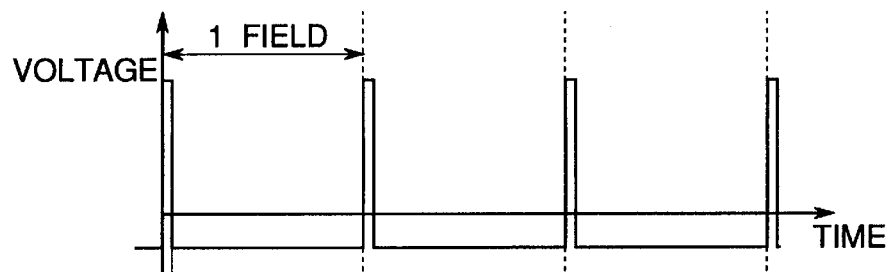
(b) TIME VARIATION OF STORING LIGHT INTENSITY
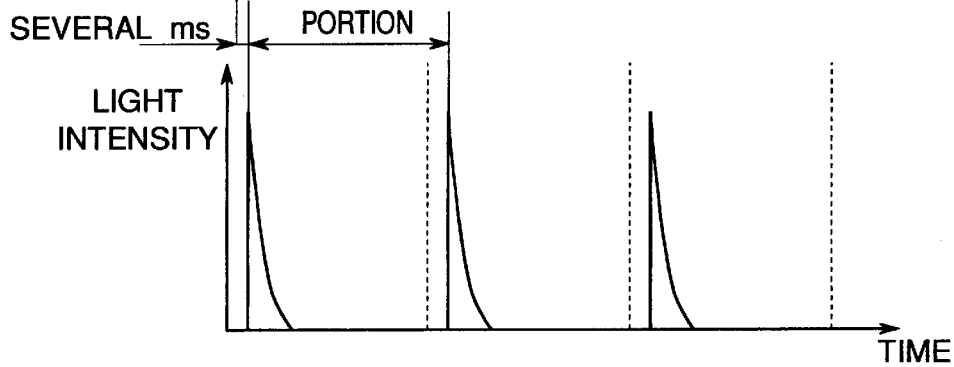
(c) OUTPUT OF SPACE LIGHT MOD. ELEMENT
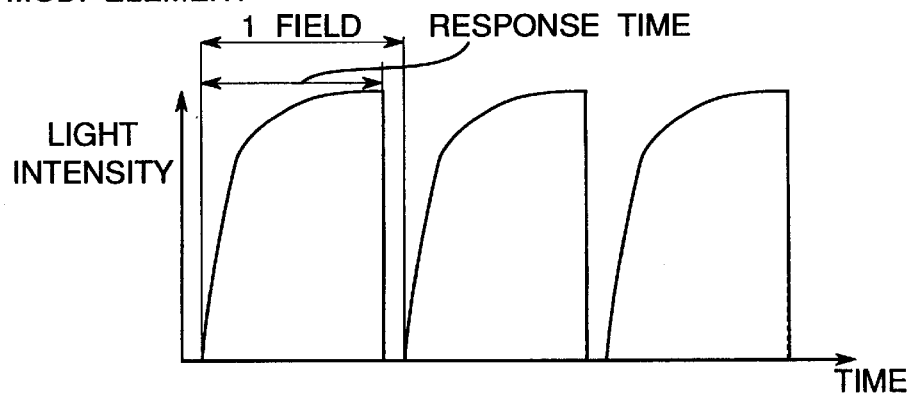

Fig.23
(a) DRIVING VOLTAGE WAVEFORM
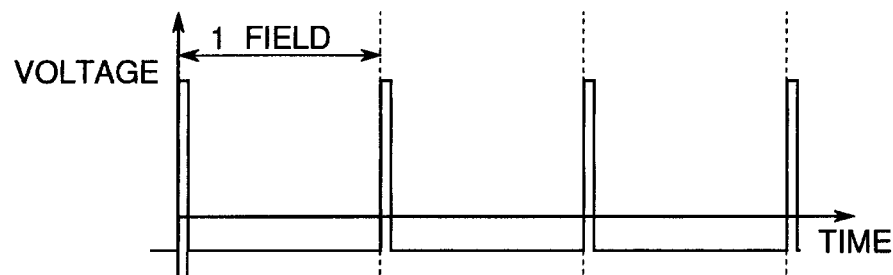
(b) TIME VARIATION OF STORING LIGHT INTENSITY
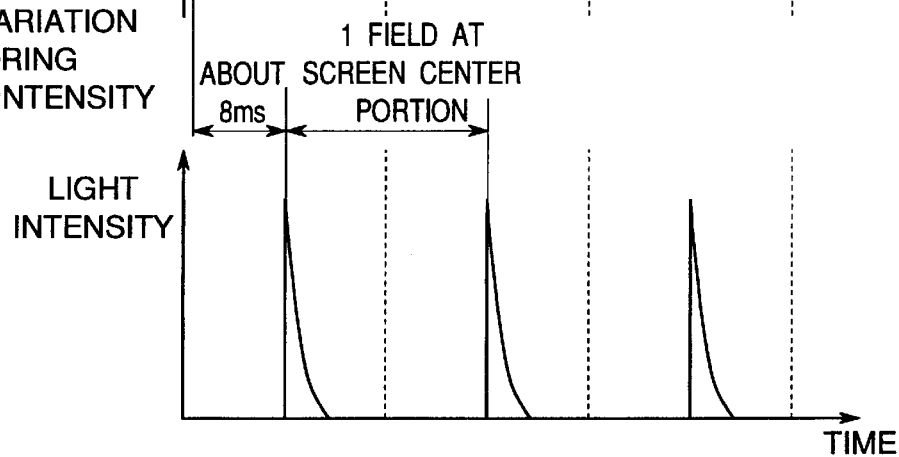
(c) OUTPUT OF SPACE LIGHT MOD. ELEMENT
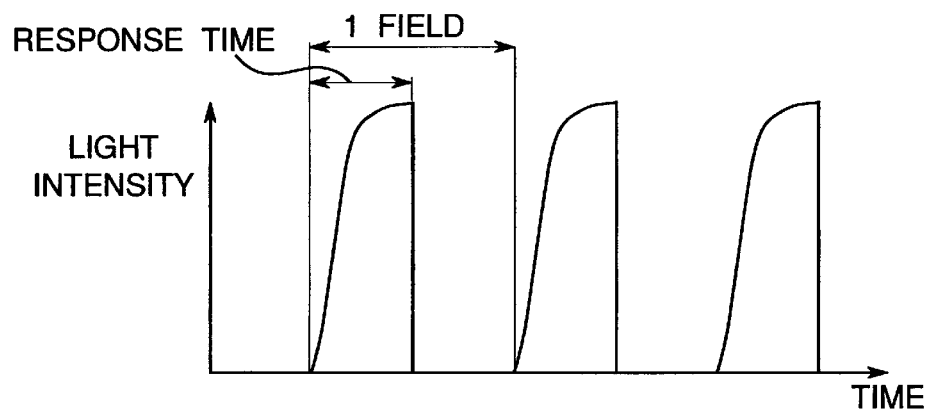

Fig.24
(a) DRIVING SIGNAL WAVEFORM
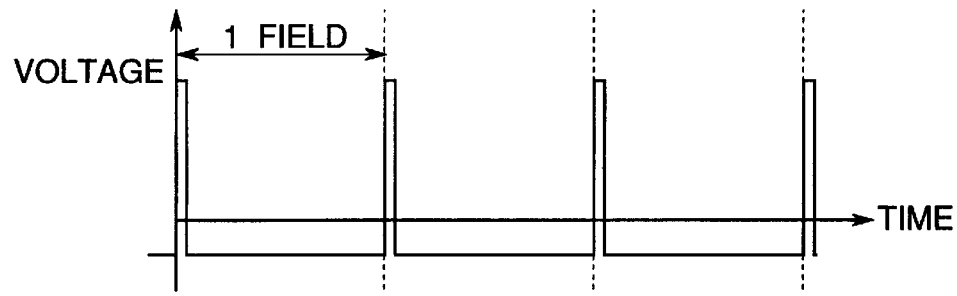
(b) TIME VARIATION OF STORING LIGHT INTENSITY
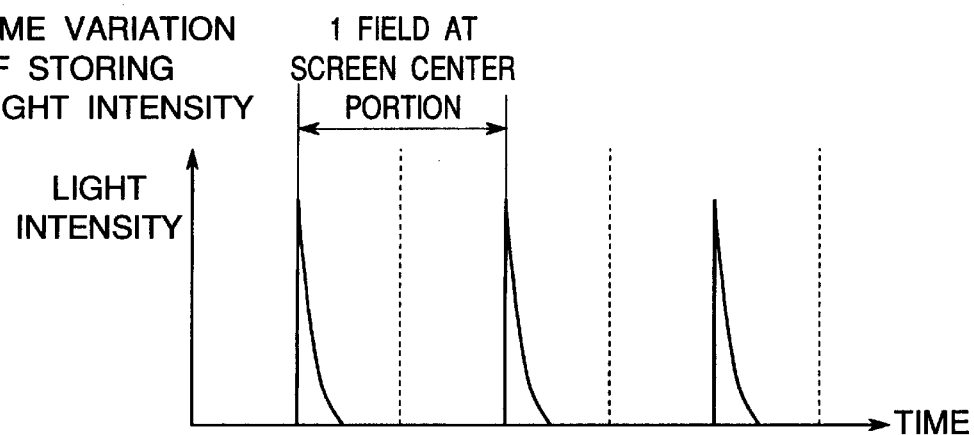
(c) OUTPUT OF SPACE LIGHT MOD. ELEMENT
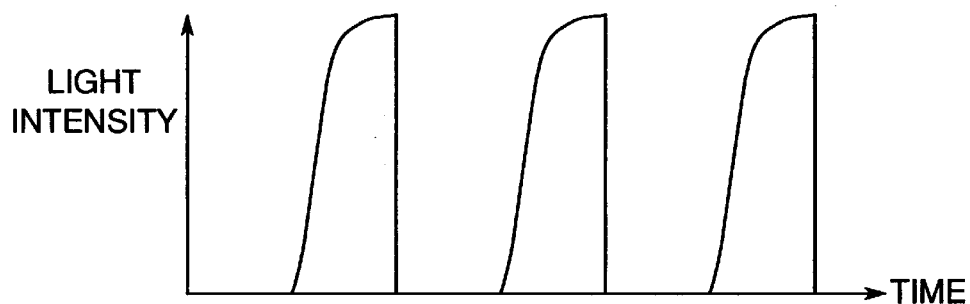

Fig.25
(a) DRIVING SIGNAL WAVEFORM
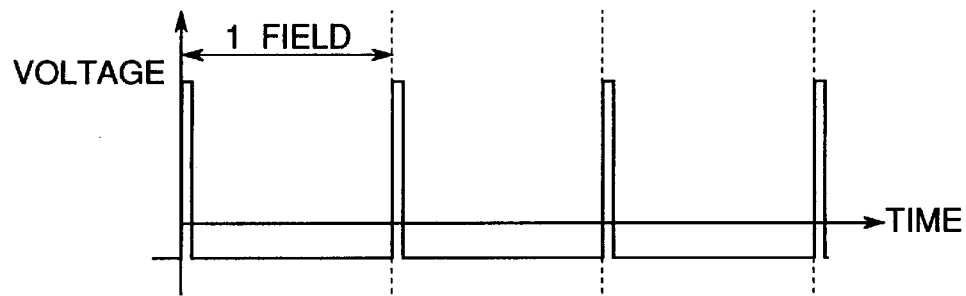
(b) TIME VARIATION OF STORING LIGHT INTENSITY
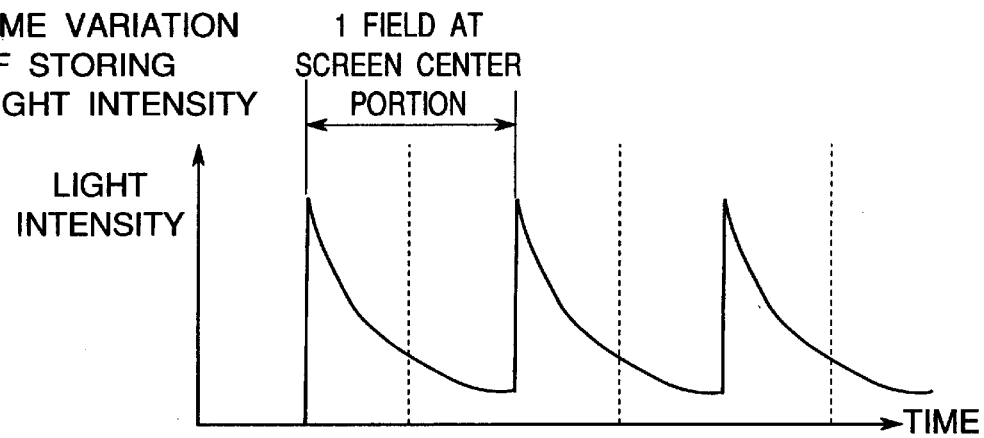
(c) OUTPUT OF SPACE LIGHT MOD. ELEMENT
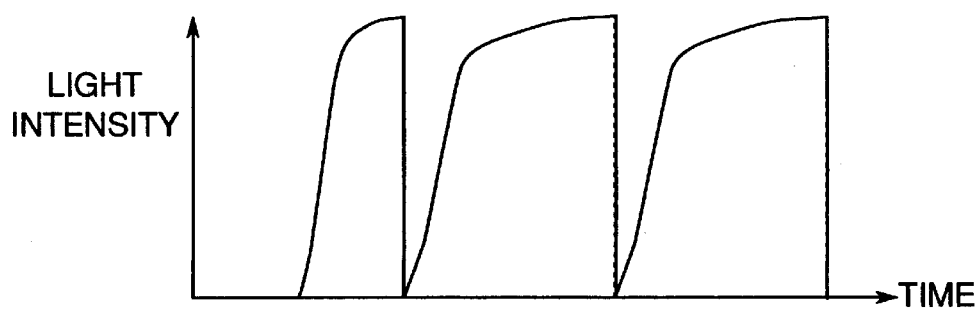

Fig.26
(a) DRIVING SIGNAL WAVEFORM
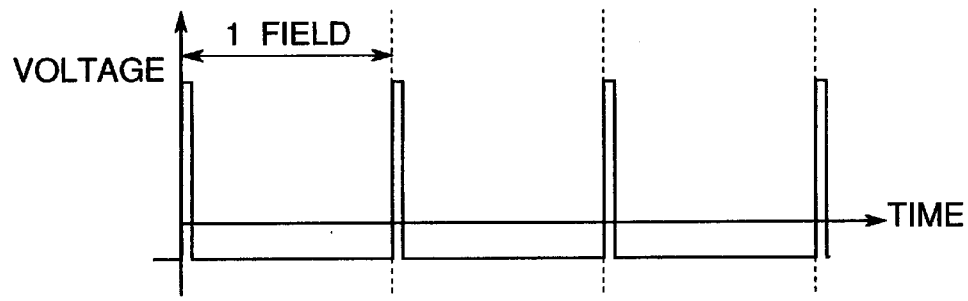
(b) TIME VARIATION OF STORING LIGHT INTENSITY
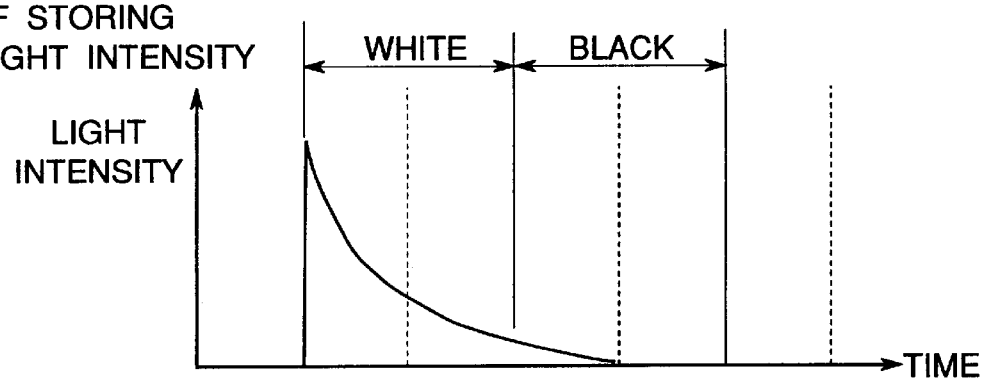
(c) OUTPUT OF SPACE LIGHT MOD. ELEMENT
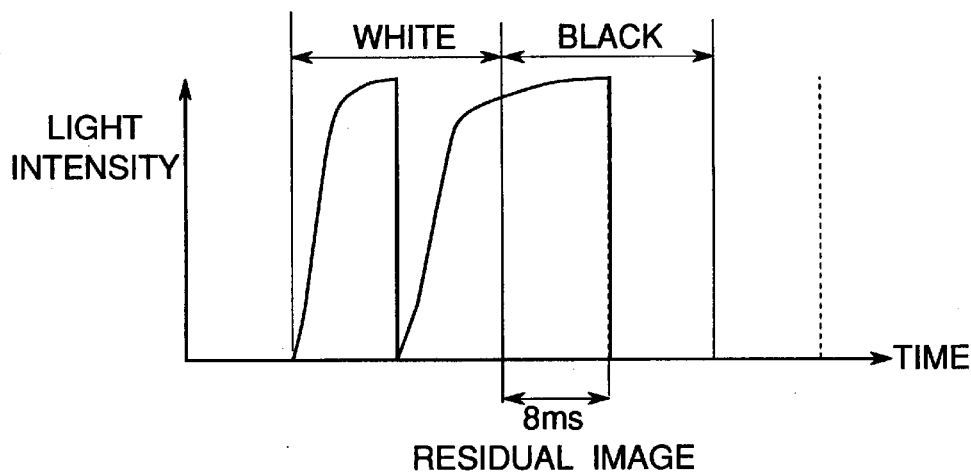

Fig.27
(a) DRIVING SIGNAL WAVEFORM
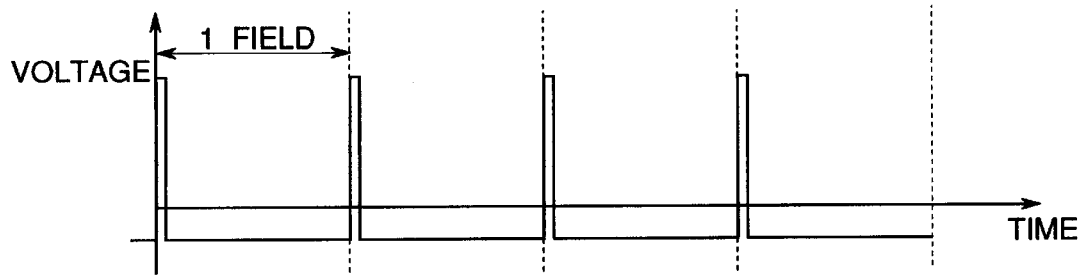
(b) TIME VARIATION OF STORING LIGHT INTENSITY
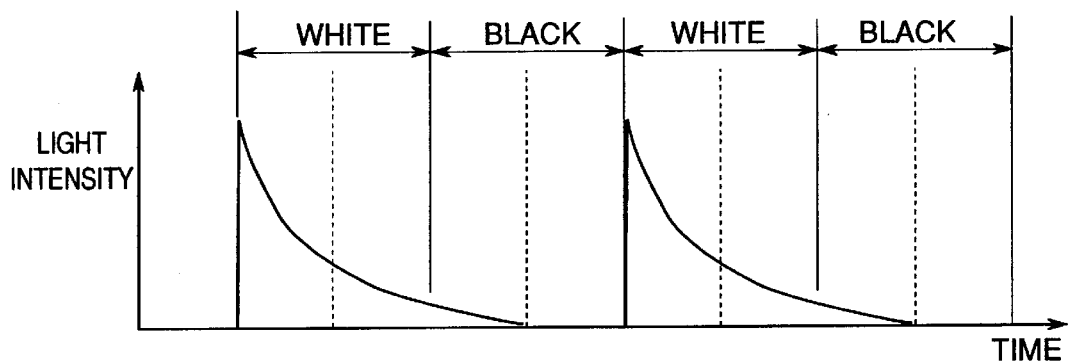
(c) OUTPUT OF SPACE LIGHT MOD. ELEMENT
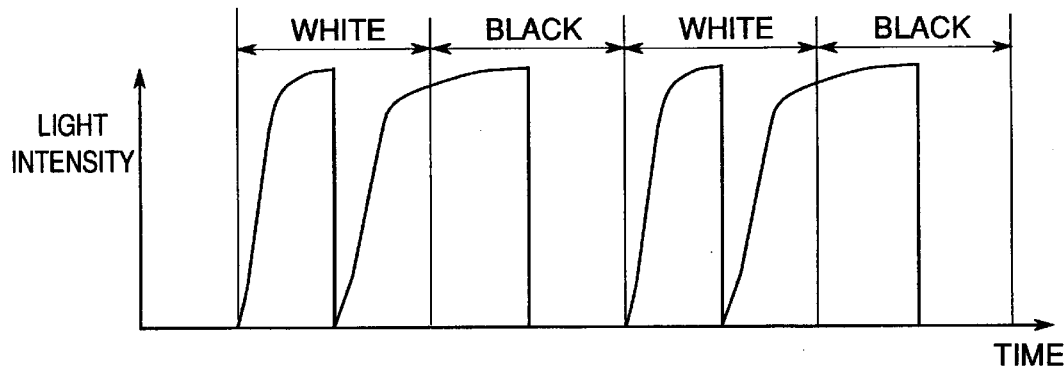

PROJECTION TYPE IMAGE DISPLAYING APPARATUS

TECHNICAL FIELD

The present invention relates a projection type image displaying apparatus for displaying images of television, VTR or the like through larger picture scenes with higher quality.

BACKGROUND ART

Recently, images of television, VTR or the like are enlarged. Development of the image displaying apparatus for displaying larger picture scenes is active. For the reason, larger size is difficult to make in the conventional direct viewing type television. Also, in the projection type image displaying apparatus using a CRT or a liquid crystal displaying apparatus such as liquid crystal panel (hereinafter referred to as TFT-LCD) driving by a thin film transistor liquid crystal panel, it becomes difficult to be higher in resolution for brighter operation. A projection type image displaying apparatus attracts public attention, using a light storing, or writing, optically addressed spatial light modulation (hereinafter referred to as OASLM) with a photoconductive layer and a modulating layer being combined (for example, Y. Tanaka and others, Japanese Journal of Applied Physics, Vol. 33 in 1994, Page 3469 through Page 3477 (Jpn. J. Appl. Phys. 33 (1994) pp. 3469–3477)).

Fundamental Art and its task

To understand the features of the present invention, the summary of the projection type image displaying apparatus using the most fundamental OASLM will be described in accordance with FIG. 17 through FIG. 27. The explanation in accordance with FIG. 17 through FIG. 27 indicates the contents experimented by us inventors, and is not prior art. FIG. 17 shows the basic construction of the OASLM. The OASLM 151 has construction where a photoconductive layer 4, a light reflection layer 5, and a light modulation 6 are held between glass substrates 2 and 2' with conductive transparent electrodes 3 and 3' being respectively provided on it. The light reflection layer 5 is divided into a plurality of pixels as shown. The photoconductive layer 4 is etched through the gaps between the pixels and a light absorbing layer 7 is formed therein.

When the write lights are inputted into the photoconductive layer 4 from the side of the glass substrate 2 of the OASLM 151, the voltage corresponding to the two-dimensional light intensity distribution of the image is applied upon the light modulation layer 6 and it switches in accordance with the voltage. As a result, reading lights which come from the side of the glass substrate 2' are modulated within the light modulation layer 6 and are outputted after the reflection by the light reflection layer 5. The light absorbing layer 7 prevents the reading lights from leaking to the photoconductive layer 4 from between the pixels of light reflection layer 5.

A projection type image displaying apparatus using the OASLM will be described in FIG. 18. The CRT, TFT-LCD and so on are used as an image source 8. The image inputting to the OASLM 151 is operated by focusing write lights 9 which are images of the image source 8 on the photoconductive layer 4 by the write lens 10. The reading lights 12 from the light source 11 are incident from the side of the light modulation layer 6 of the OASLM 151. The reading lights are modulated by the light modulation layer 6. After that, the lights have been reflected by the reflection layer 5, and are outputted through the light modulating layer 6 again. The output lights 13 are visualized through the visualizing means 14 and are enlargingly projected onto the screen 16 by the projection lens 15. The driving signal generating circuit 30 produces a driving signal S5 which drives the OASLM 151, and is produced from the vertical synchronous signal from the image source 8, to erase, and/or store images from the image source 8.

A liquid crystal material such as nematic type liquid crystal, ferroelectric liquid crystal and so on can be used as the light modulation layer 6, and the amorphous silicon of p-i-n structure can be used as the photoconductive layer 4. As a visualizing means 14, a polarization beam splitter can be used, and a metal hyride lamp, a xenon lamp or the like can be used as the light source 11.

In principle, it is possible to conduct a bright and higher-resolution image displaying operation by raising the output of the light source 11 and making the image of image source 8 into the OASLM higher in resolution in such a projection type image displaying apparatus.

A method of driving the OASLM 151 will be described hereinafter. FIG. 20 shows a basic driving signal wave form of the OASLM. The driving signal consists of a positive pulse (hereinafter referred to as erasing pulse) in synchronous relation with the vertical synchronous signal of the image and a negative pulse (hereinafter referred as writing pulse). The period where the writing pulse is applied to the OASLM is culled writing period, and the period where the erasing pulse is applied to the OASLM is called a erasing period. The OASLM reads in accordance with the light intensity inputted at a writing period so as to output the modulating light. An initializing operation is effected compulsorily in spite of the existence of the write light, during a erasing period, to remove the output to zero. When the respond-quick ferroelectric liquid crystal is used as the light modulating layer, the output becomes zero within several hundreds micro seconds after the impression of the erasing pulse.

FIG. 19 is a construction view of the driving signal generating circuit 30 for generating the driving signal of FIG. 20. In FIG. 19, the erasing voltage generating circuit 31 outputs the voltage of the erasing pulse, and the writing voltage generating circuit 32 outputs the voltage of the writing signal all the time. The pulse width controlling circuit 33, composed of a mono-stable multi-vibrator, normally outputs a voltage corresponding to the logic 1, and outputs (S4) a voltage corresponding to a logic 0 in a constant period after the rising edge input of the vertical synchronous signal S1. The switch circuit 34 and the resistance 35 feed the output voltage of the writing voltage generating circuit 32 when the output voltage of the pulse width controlling circuit 33 is a logic 1, and the output voltage of the erasing voltage generating circuit 31 when the signal is a logic 0, respectively to the output amplifier 36 (SS). The output amplifier 36 amplifies the input signal and outputs it.

In the evaluation of the image, the uniformity and the afterimage or the like are important parameters in addition to the brightness and the resolution. In the projection type image displaying apparatus using the OASLM shown in FIG. 17, it is impossible to satisfy simultaneously with three elements of high brightness, realizing of uniformity of the brightness and removing of afterimages.

The reasons for them will be described briefly with reference to the drawings. The brightness, uniformity of the brightness, and afterimage of the projection images are decided in a manner explained below. FIG. 21 is a time response wave form in a certain one point of image projected on the screen. The brightness of the image is decided by a product of an area of response wave form, i.e., the peak height and the ratio of the time (hereinafter referred to as time aperture factor) when the OASLM responds with respect to one field period (vertical scanning period). The height of the peak depends the brightness of the light source, the efficiency of a illuminating optical system (not shown), the modulating efficiency of the OASLM. The time response wave form depends upon a writing light intensity to be inputted for the writing period, and the timing when the writing starts. To raise the uniformity of the brightness, the time aperture factor of the OASLM has only to be equalized through the whole image with respect to the same writing light intensity. To remove the afterimages, the OASLM is required to be responded faithfully with respect to the input image to be inputted for each of one field period.

Difficulty in the simultaneous settlement of the task of the brightness, uniformity of the brightness, the afterimages in the projecting type image displaying apparatus will be described by way of an example where CRT is a writing source. In the case of CRT, a substrate emits its light immediately after an addressing by the electron beam and the light emitting operation is attenuated by its inherent time constant. Namely, for one point of the OASLM a writing light which is attenuated in terms of time is inputted.

The output of the OASLM in three points, such as upper portion, middle portion and lower portion, of the projection image is considered. Assume that the input signal is a white signal of NTSC (1 field period=about 16.7 milliseconds). In the OASLM, the erasing pulse is applied upon the whole face of the OASLM, synchronizing with the vertical synchronous signal. FIG. 22 indicates a driving signal wave form (FIG. 22 (*a*)) in the upper portion of the projection image, the time change of the writing light (FIG. 22 (*b*)), the response wave form of OASLM (FIG. 22 (*c* )). In the upper portion of projecting image shown in FIG. 22, the writing light is inputted (FIG. 22 (*b* )) within few milliseconds after the erasing operation has been conducted. The OASLM can respond almost 1 field period (FIG. 22 (*c*)), so the time aperture factor is high.

As shown in FIG. 23, the writing operation is effected (FIG. 23 (*b*)) at about 8 milliseconds after the erasing operation has been conducted in the projection image central portion. Although the OASLM starts to respond immediately after it, the erasing pulse is applied after the next vertical synchronous signal and the output of the OASLM becomes zero. Namely, the responding operation is conducted (the time aperture factor is about 50%) only for about as half as 16.7 milliseconds. In the lower portion of the projection image as shown in FIG. 24, the erasing operation is effected immediately after the writing operation starts. Therefore, the response period for 16.7 milliseconds is extremely shorter.

Namely, a timing in which the writing light is inputted is different among various places in the OASLM, but the erasing pulse is applied at the same time. Thus, the time aperture factor is different in space by the difference of the writing and the erasing timing, and the lower portion of the projecting image becomes darker. In this manner, the uniformity of the brightness of the projection image is spoiled considerably.

In order to realize the uniformity of the time aperture factor, (uniformity of the brightness of the projection image) (1) the storing light intensity of the image upper portion is lowered so as to be lower the time aperture factor of the whole image as that of lower portion, (2) the afterglow of the fluorescent substrate to be used in the CRT is made longer, i.e., the attenuation operation of the light emitting operation from the fluorescent substrate is made slower, (3) the response speed of the OASLM is made slower, and (4) the driving frequency is made higher (more than ten times) with respect to the field frequency. However, in the case of (1), the image becomes darker. In the methods of the (2) and (3), even if the brightness and the uniformity can be realized, it is impossible to reduce the afterimages. In the method of the (4), beating becomes conspicuous and sufficient uniformity cannot be obtained and the writing light intensity is necessary to increase considerably. Therefore, the resolution of the original image from the CRT is reduced.

For example, the brightness of the projection image is considered when the afterglow of the fluorescent substrate of the CRT is made longer. The response of the projection image of the central portion is shown in FIG. 25. The erasing operation is conducted once after about 8 milliseconds from the light emission. When the afterglow of the fluorescent substrate is long, so the writing light which can respond the OASLM sufficiently is given, even at the time when the next writing period has been applied. So, the OASLM responds again. It is possible to obtain high time aperture factor as approximately much as that of the upper portion as shown in FIG. 22. This is similar as that even in the lower portion of the projection image. Namely, it is possible in principle to make the time aperture factor the same as that in all the location of the projection image by adjusting the strength of the light to be written.

But when specific signal (for example, the black signal) of the image which is different from that of the prior field is inputted continuously, the OASLM cannot be responded faithfully with respect to the change in the signal. A further description will be given in connection with FIG. 26 showing the response wave form of the projection image central portion. The afterglow of the florescent substrate of the CRT is long as shown in FIG. 26 (*b*). Therefore, the responding operation is conducted again (FIG. 26 (*c*)) after the OASLM has been erased by the erasing pulse at about 8 milliseconds after the response. As the next erasing operation is conducted after 16.7 milliseconds, the OASLM remains responded even in the time where the black should be originally displayed. Namely, the afterimage of about 8 milliseconds is caused. As a result, when a flicker signal consists of repeat of the white and black signal for each 1 field period is inputted, the output of the OASLM is repeated in half tone as shown in FIG. 27.

Such afterimages are considerably reduced in the resolution degree of the moving image, so as to give large different feeling to an observer. For example, the moving object of the image looks leaving a trail. The same afterimage can be observed even by the OASLM with slow response of the light modulation larger. As above, in the conventional projection type image displaying apparatus using the OASLM of FIG. 17, it is impossible to simultaneously settle the problems of the brightness, uniformity and afterimage.

An object of the invention is to provide a projecting type image displaying apparatus capable of image display which is brighter, higher in uniformity and extremely reduced in afterimage.

DISCLOSURE OF INVENTION

A projecting type image displaying apparatus of the invention is provided with, at least an OASLM and an image source which is for displaying images to be inputted to the OASLM, by the time serial scanning operation. The OASLM is adapted to grasp at least a photoconductive layer, a light reflection layer, and a light modulating layer by a first glass substrate provided with a first conductive transparent electrode and a second glass substrate provided with a second conductive transparent electrode. At least either of the first conductive transparent electrode on the side of the photoconductive layer and a second conductive transparent electrode on the side of the light modulating layer is divided into a plurality of regions. The frequency of the driving signal to be applied upon each region of the first or second divided conductive transparent electrode is approximately identical to the vertical scanning frequency of the image. The phase difference of the driving signal between the adjacent regions of the first or second divided conductive transparent electrode is approximately equal to the vertical effective scanning period divided by the number of the regions, which is obtained by removing the vertical flyback period from the vertical scanning period.

In the projecting type image displaying apparatus of the invention, the writing light from the image source for displaying the image by the time serial scanning is inputted into the OASLM. The OASLM is formed into a plurality of regions with the conductive transparent electrode of either the photoconductive layer side or the light modulating layer side is divided into belt shape in approximately parallel to the horizontal scanning direction of the image. The timing of the erasing pulse application is put out of place for each region so that the writing light may be inputted immediately after applying of the erasing pulse.

The invention is to provide of a projecting type image displaying apparatus which can display large scenes for television, VTR and so on, and at the same time can retain the brightness, realize the uniformity, and remove the after-image.

BRIEF DESCRIPTION OF DRAWINGS

FIG. 7 shows a driving signal wave form (a) of a OASLM, a time response wave form (b) of the writing fluorescent substrate, and a response wave form (c) of the output of the OASLM constructed in one embodiment of the invention;

FIG. 8 shows a driving signal wave form (a) of the OASLM, a time response wave form (b) of the writing fluorescent substrate, and a response wave form (c) of the output of the OASLM constructed in one embodiment of the invention;

FIG. 22 shows a driving signal wave form (a) in the screen upper portion of the conventional projection type image displaying apparatus; a time response wave form (b) of a writing florescent substrate; and a response wave form (c) of the output of the OASLM;

FIG. 23 shows a driving signal wave form (a) in the screen central portion of the conventional projection type image displaying apparatus; a time response wave form of a writing fluorescent substrate; and a response wave form (c) of the output of the OASLM;

FIG. 24 is a driving signal wave form (a) in the screen lower portion of a conventional projection type image displaying apparatus, a time response wave form of a writing fluorescent substrate, and a response wave form (c) of the output of the OASLM;

FIG. 25 is a driving signal wave form (a) in the screen central portion of a projection type image displaying apparatus using a CRT of long afterglow, a time response wave form (b) of a writing fluorescent substrate, and a response wave form (c) of the output of the OASLM;

FIG. 26 is a driving signal wave form (a) in the screen central portion of a projection type image displaying apparatus using a CRT of long afterglow, a time response wave form (b) of a writing fluorescent substrate, and a response wave form (c) of the output of the OASLM;

FIG. 27 is a driving signal wave form (a) in the screen central portion of a projection type image displaying apparatus using a CRT of long afterglow, a time response wave form (b) of a writing fluorescent substrate, and a response wave form (c) of the output of a OASLM.

BEST MODE FOR CARRYING OUT THE INVENTION

The embodiment of the invention will be described hereinafter with reference to the drawings.

(Embodiment 1)

Figure 1:
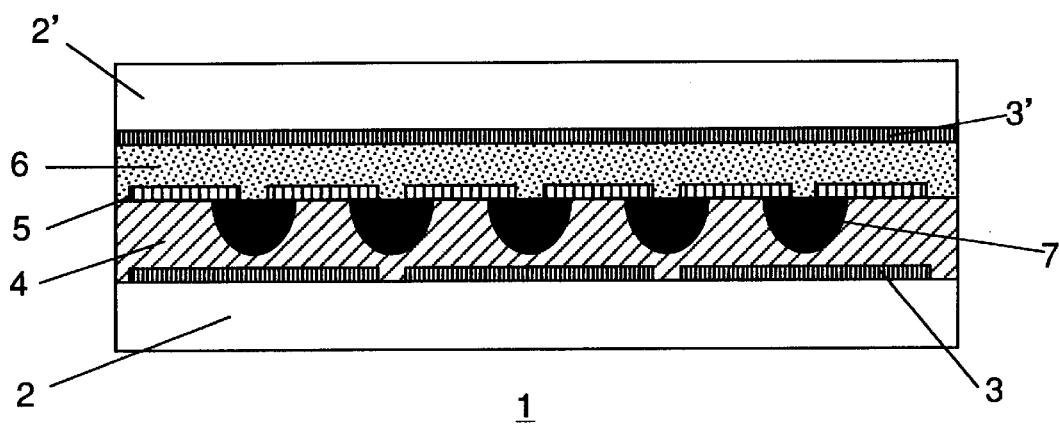
FIG. 1 is a sectional view of an OASLM constructed in one embodiment of the invention.

FIG. 1 is a sectional view of the space light modulating element (hereinafter referred to as OASLM) in a first embodiment of this invention. The OASLM 1 has a conductive transparent electrode 3 on a glass substrate 2, a photoconductive layer 4, and a light reflection layer 5 formed on it. The light reflection layer 5 is divided into plurality pixels as shown in the drawing. The photoconductive layer 4 in the respective gaps are etched to form a groove, and thereafter, the light absorbing layer 7 is formed.

In the OASLM 1 of this embodiment, the conductive transparent electrode 3 is divided (divided into three in the drawing) into regions each being belt-shape parallel to the horizontal scanning direction of the image to be inputted. Actually, the OASLM having 32 regions are formed.

It is possible to construct the OASLM 1 having the light preventing layer (not shown) in the groove between the light reflection layer 5 to prevent a part of the reading light from being leaked to the photoconductor 4 of the OASLM.

The OASLM 1 of this embodiment grasps a light modulating layer 6 by a glass substrate 2' with the conductive transparent electrode 3'. Material, such as ITO, ZnO, $SnO_2$ or the like, can be used as conductive transparent electrodes 3 and 3'.

As a photoconductive layer 4 can be used a compound semiconductor such as CdS, CdTe, CdSe, ZnS, ZnSe, GaAs, GaN, GaP, GaAlAs, InP or the like, a non-crystal semiconductor such as Se, SeTe, AsSe or the like, a polycrystalline or non-crystalloid semiconductor such as Si, Ge, $Si_{1-x}C_x$, $Si_{1-x}Ge_x$, $Ge_{1-x}C_x$ (0<x<1) or an organic conductor such as (1) phthalo cyanine pigment (abbreviated as Pc) such as non-metal Pc, XPc (X=Cu, Ni, Co, TiO, Mg, Si(OH)$_2$ or the like), AlClPcCl, TiOClPcCl, InClPcCl, InClPc, InBrPcBr or the like, (2) azo coloring matter such as monoazo coloring matter, disazo coloring matter or the like, (3) penilen system pigment such as penilen acid anhydride, penilen acid imido or the like, (4) indigoid dye, (5) quinochrydon pigment (6) polycyclic quinone such as anthraquinone, pyrenquinon, or the like, (7) cyanine coloring matter, (8) xanthene dye, (9) electric charge moving complex body such as PVK/TNF or the like, (10) eutectic complex body formed of a birilum dye and polycarbonate resin, (11) organic semiconductor such as azlenium compound or the like.

When non-crystal Si, Ge, $Si_{1-x}C_x$, $Si_{1-x}Ge_x$, $Ge_{1-x}C_x$ (hereinafter referred to as a-Si, a-Ge, a-$Si_{1-x}C_x$, a-$Si_{1-x}Ge_x$, a-$Ge_{1-x}C_x$) is used as an photoconductive layer, hydrogen or halogen element can be contained or oxygen or nitrogen can be included for increasing resisting factor with dielectric factor being made smaller. To control the resisting factor, element such as B, Al, Ga or the like which is p type impurity or element such as P, As, Sb or the like which is n type impurity can be added. A splicing operation of p/n, p/i, i/n, p/i/n, p/i/n/i or the like by laminating non-crystal material with impurity being added onto it in this manner. The dielectric constant and the dark resistance or operating voltage electrode can be controlled by forming a hollow layer within the photoconductive layer. A hollow layer can be formed within photoconductive layer through the formation of a hetero splicing by the lamination of not only such non-crystal material, but also two types of materials or more. In this embodiment, a-Si of the p/i/n diode construction is filmed 4 μm into a photoconductive layer 4.

In this embodiment, a transparent conductive electrode 3 is patterned and thereafter, a photoconductive layer 4 is filmed. When a stair difference generally exists in the foundation for forming a photoconductive layer, the stair difference becomes larger after the filming of the photoconductive layer. As the film thickness of the photoconductive layer becomes increased, the stair difference becomes larger. The stair difference in this embodiment is approximately 1000 Å (Angstrom) in thickness of the conductive transparent electrode 3. When the film thickness of the photoconductive layer is 100 times or less of the stair difference of the foundation, the thickness of the photoconductive layer is desired to be at least 10 μm or less, because the stair difference after the film formation is not conspicuous.

As the light reflection layer 5 can be used a dielectric mirror or the like formed with metal thin film of high reflection constant such as Al, Ag or the like being laminated. In this embodiment, Cr is filmed for improving the strength when the groove construction is formed, and then, Al is filmed to make light reflection layer 5.

The light absorbing layer 7 only absorb for the light of the length being high sensitivity of the photoconductive layer 4. A light absorbing material or the like can be used where black pigment such as carbon particle or the like and coloring matter molecule are scattered with respect to a base material of highly polymerized material such as acrylic, polyimde, polyamide or the like.

As a light modulating layer 6 can be used a liquid crystal material such as ferroelectric liquid crystal antiferroelectric liquid crystal, TN liquid crystal, STN liquid crystal or the like. In this embodiment, ferroelectric liquid crystal capable of high speed responding operation is used.

Figure 2:
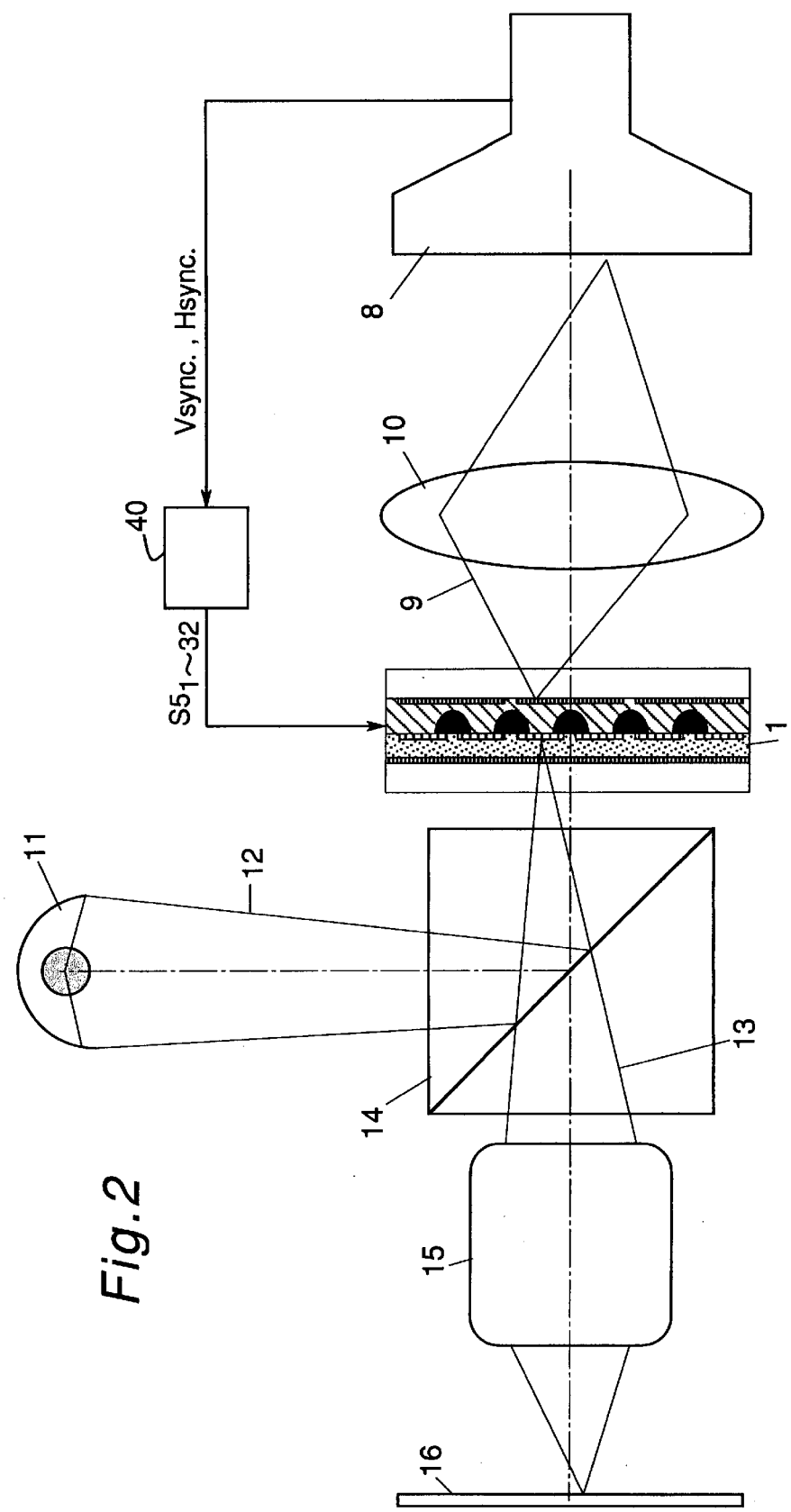
FIG. 2 is a construction view of a projection type image displaying apparatus using the OASLM constructed in one embodiment of the invention.
Figure 18:
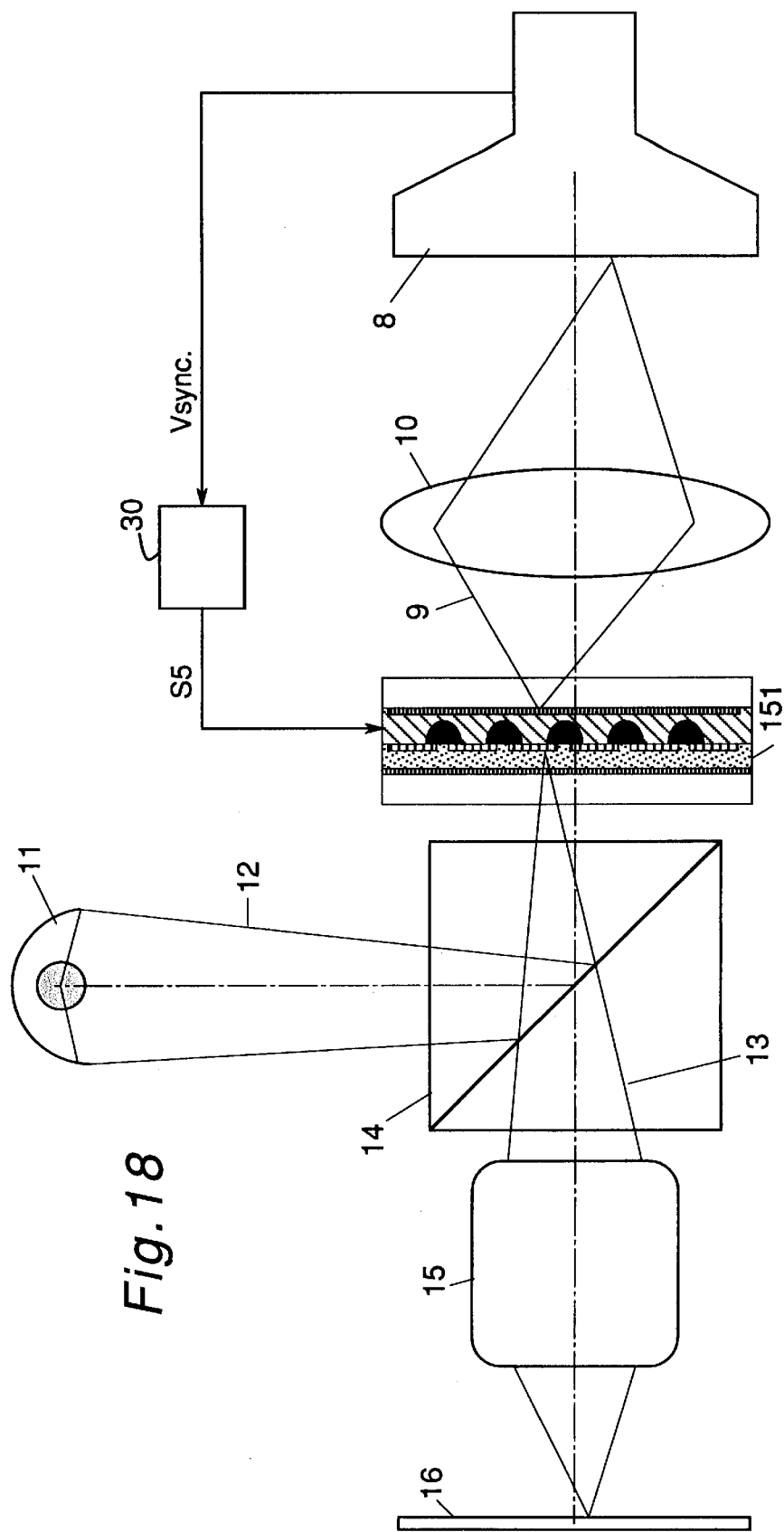
FIG. 18 is a configurational view of a projection type image displaying apparatus constructed with the use of the conventional OASLM.

FIG. 2 shows a projecting type image displaying apparatus constructed with the use of OASLM 1 of this embodiment. The basic construction is the same as that in an example shown in FIG. 18. The output light from the image source 8 is formed in image on the photoconductive layer 4 through the writing lens 10 as a writing light 9, so to be inputted in image to the OASLM 1. The reading light 12 from the light source 11 is incident from the side of the light modulating layer 6 of the OASLM 1 and modulated by the light modulating layer 6. After the reflection has been conducted by the light reflection layer 5, the light passes through light modulating layer 6 again and is outputted. The output light 13 is visualized through a visualizing means 14 and is enlarged by the projecting lens 15, and projected onto the screen 16. As a visualizing means 14 is used a PBS, a high brightness xenon are lamp as a light source. The driving signal generating block 40 outputs 32 driving signals with respect to each region of the conductive transparent electrodes 3 divided into 32.

The image source 8 has only to be an image displaying element for displaying the image in time series within the vertical synchronous period of the display image. A liquid crystal displaying apparatus such as TFT-LCD or the like, self-light-emitting type display such as CRT plasma display or the like, or laser light scanning type image displaying apparatus provided with laser and a scanning means such as polygon mirror for deflecting the laser light. In this embodiment, the CRT is used.

Figure 20:
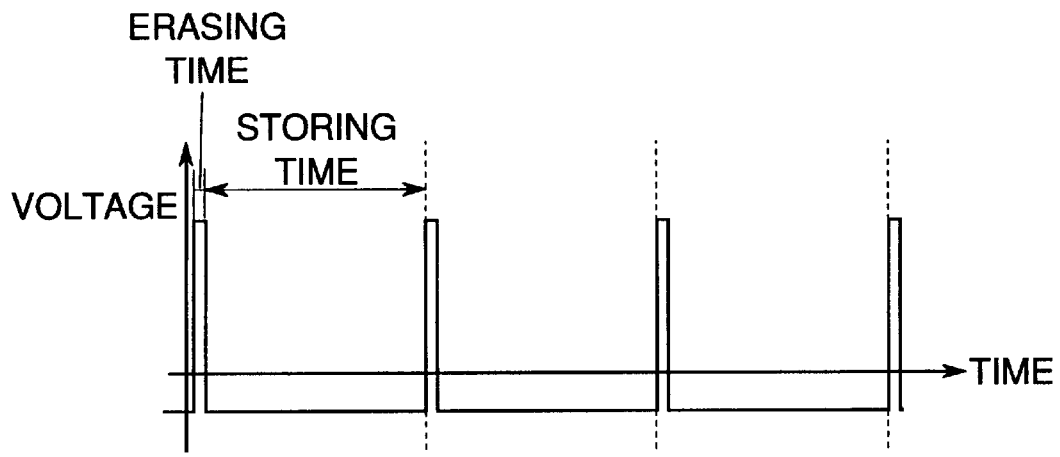
FIG. 20 is a driving signal wave form view of the conventional OASLM.
Figure 21:
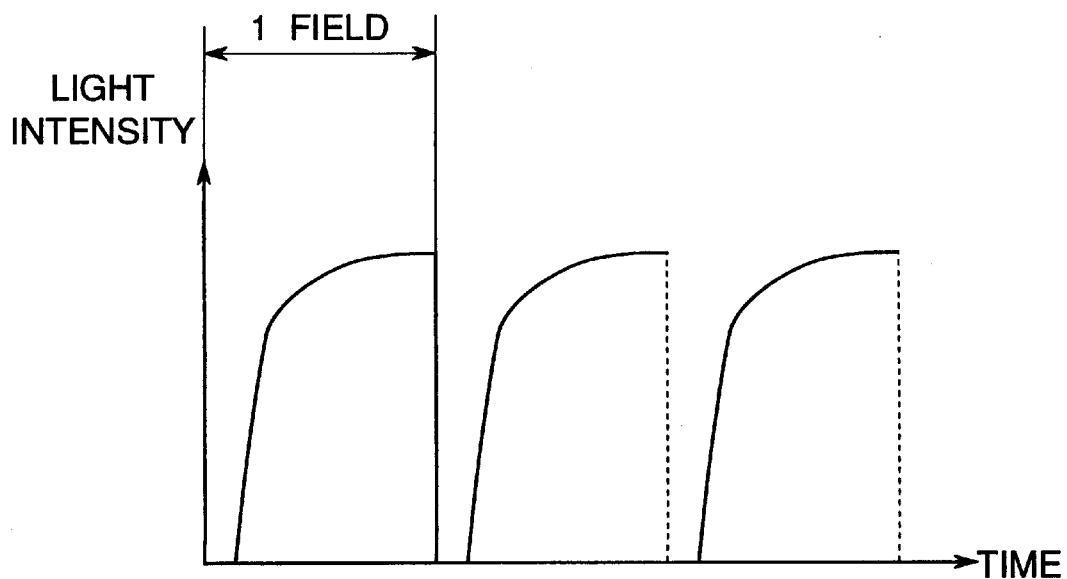
FIG. 21 is a light output wave form view of the conventional OASLM.

The driving signal in the projecting image displaying apparatus in this embodiment is prepared by one with respect to each region of the conductive transparent electrode 3 with the driving signal being divided shown in FIG. 20. An adjusting operation is conducted so that the writing light can be inputted immediately after the application of the erasing pulse even in any region with the phase of each driving signal being out of place for each region. The frequency of each driving signal is identical to the vertical scanning frequency of the image signal, i.e., the field frequency. The driving signal wave form, the output of the CRT, the output of the OASLM will be described hereinafter with reference to the drawings.

Figure 3:
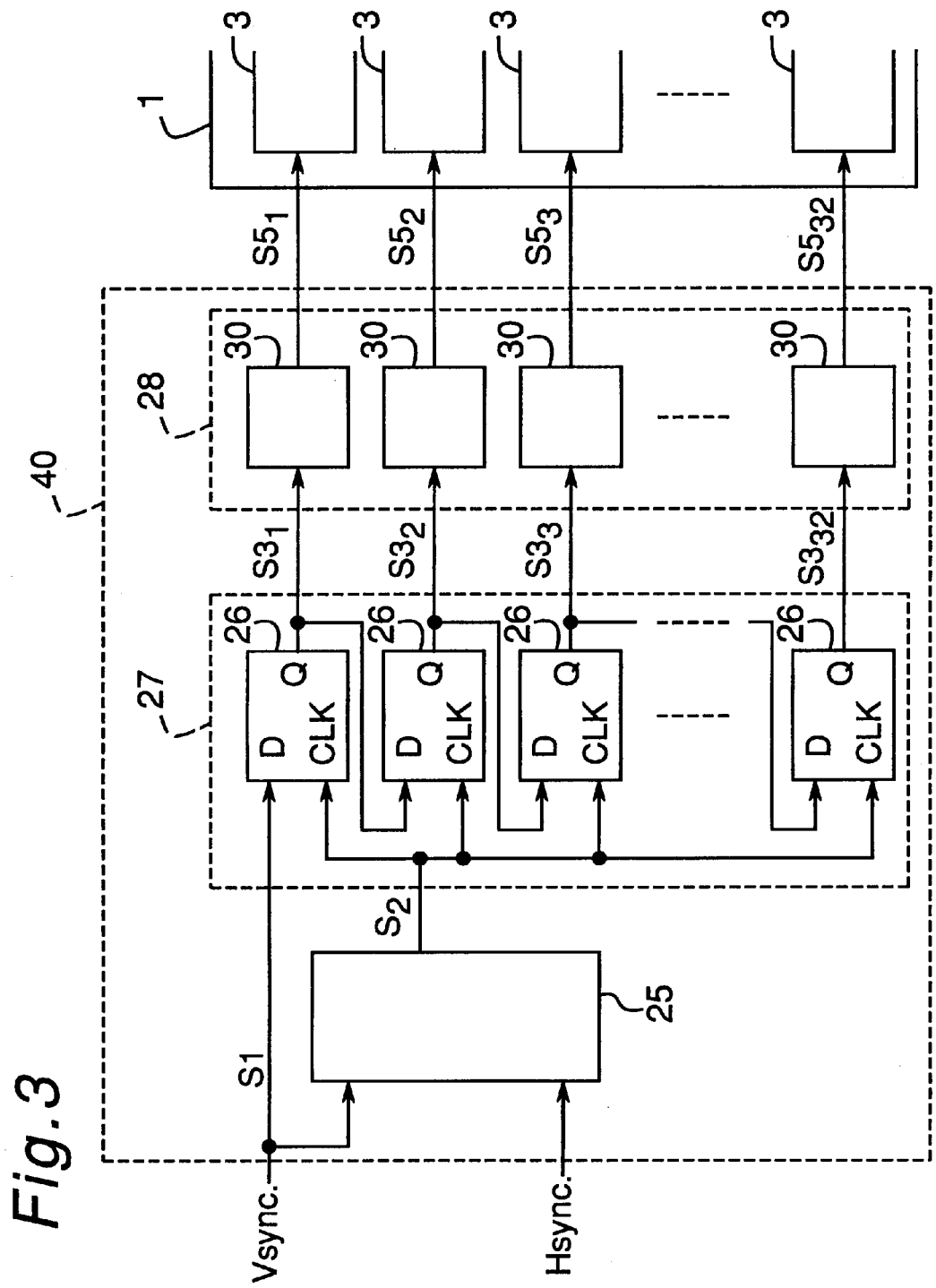
FIG. 3 is a block diagram for generating a driving signal in a projecting type image displaying apparatus of the invention.
Figure 4:
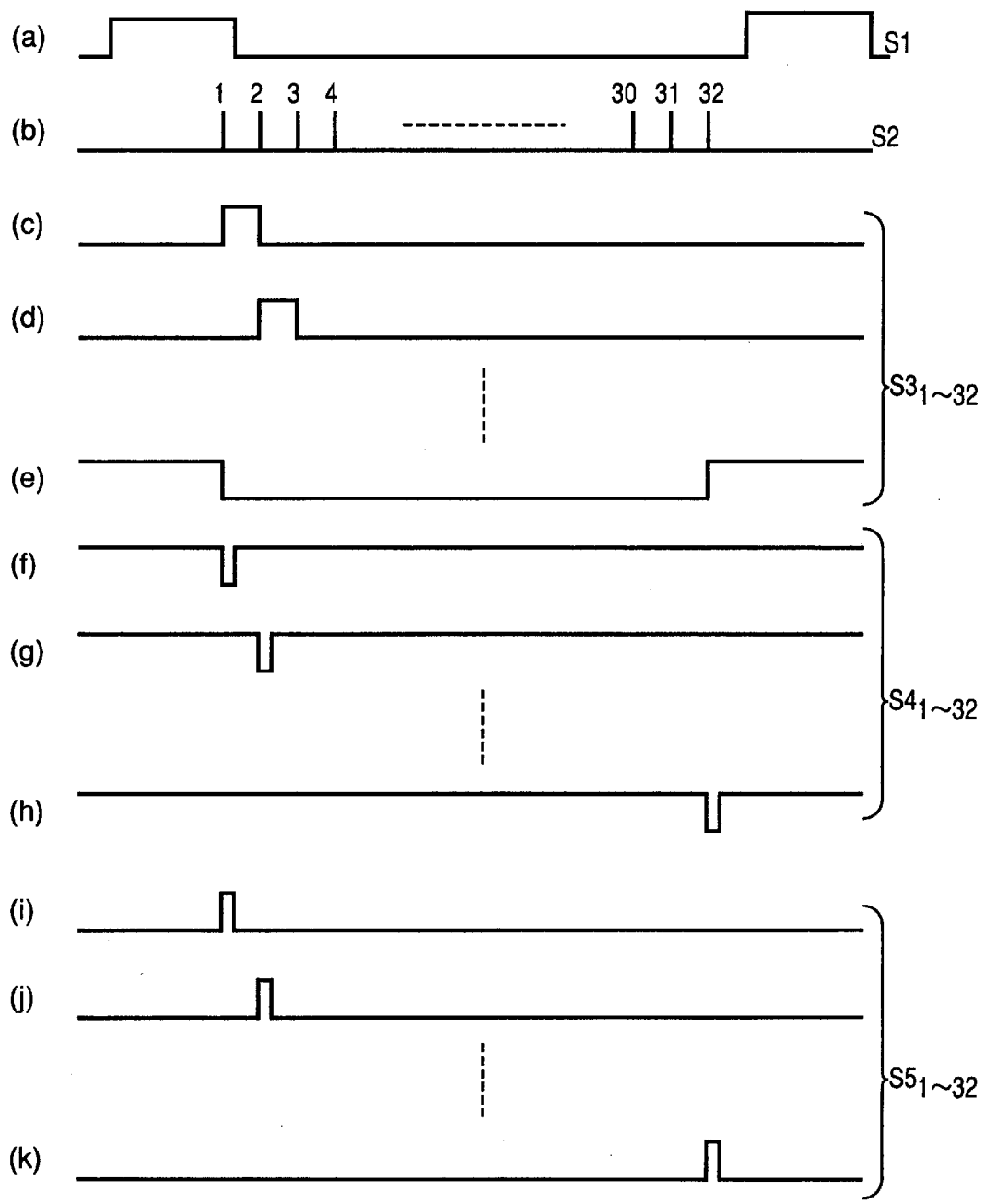
FIG. 4 is a signal wave form view of each signal in FIG. 3.

A method of generating a driving signal will be described with the use of FIG. 3 and FIG. 4 will be described. FIG. 3 shows the block diagram for generating driving signals in this embodiment. FIG. 4 is a wave form chart of a signal in each portion within FIG. 3. A counter 25 inputs a vertical synchronous signal (FIG. 4 (a)) and a horizontal synchronous signal, so as to count the horizontal synchronous signals. The counter outputs a pulse S2 (FIG. 4 (b)) for each of a given synchronous signals from a time point a little before the vertical synchronous signal rises and/or falls. A shift register 27, composed of 32 D-FF26 connected in total, inputs as shown in FIG. 3, the vertical synchronous signal S1 (FIG. 4 (*a*)) and the output pulse S3 of the counter 25. The outputs (S3$_{1-32}$) of each D-FF26 within the shift register 27 become signals shown in FIG. 4 (*c*) through (*e*).

Figure 19:
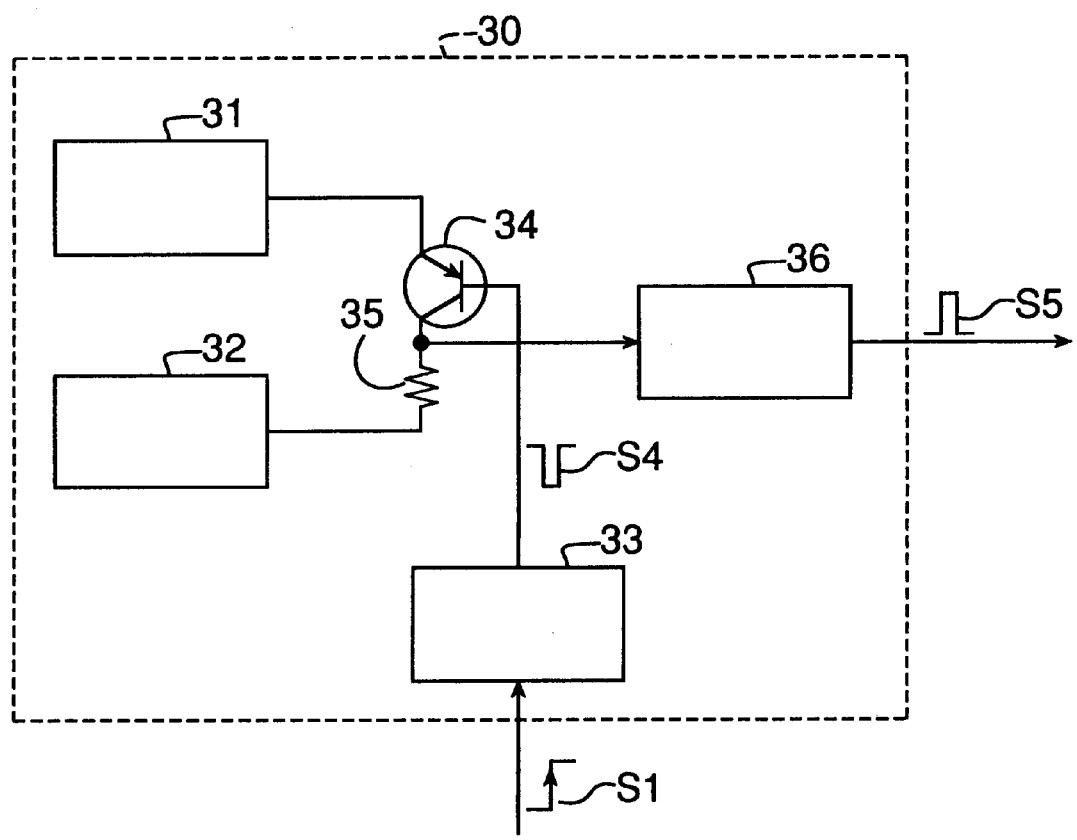
FIG. 19 is a block diagram of a driving signal generating circuit of a conventional projection type image apparatus.

A group 28 of driving signal generating circuits, composed of 32 driving signal generating circuits 30 in total, inputs output of each D-FF26 within the shift register 27 into respective driving signal generating circuits 30. Each driving signal generating circuit 30 within the driving signal generating circuit group 28 outputs the erasing pulse for a constant period from the rising edge of the input signal, as described already, to output a writing signal during a period except for it. Accordingly, a driving signal generating circuit group 28 outputs 32 driving signals (S5$_{1-32}$) having phase difference equal to time between each pulse to be outputted by a counter 25, as shown in FIG. 4 (*i*) through (*k*). The driving signals (S5$_{1-32}$) is fed to each region of the conductive transparent electrode 3 divided respectively. The signals S4$_{1-32}$ shown in FIG. 4 (*f*) through (*h*) are signals corresponding to the signals S4 of FIG. 19.

Figure 5:
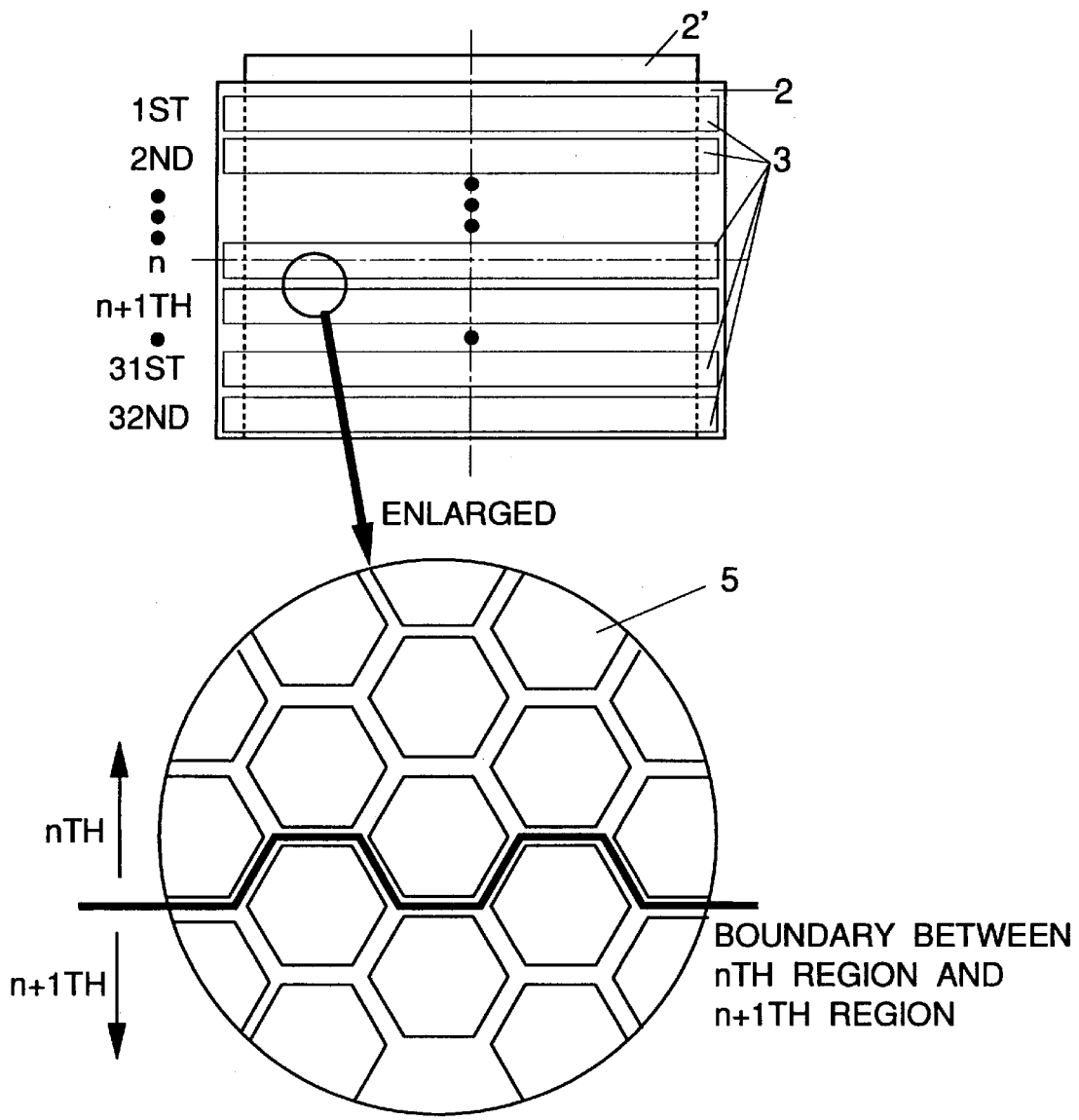
FIG. 5 is a view showing the plane figure of the OASLM and the enlarged portion of the light reflection layer constructed in one embodiment of the invention.

FIG. 5 shows a conductive transparent electrode 3. The conductive transparent electrode 3 is divided into the belt-like region parallel to the scanning line of the input images and the driving signals corresponding to respective regions from both the ends of each region is applied. In this embodiment, a light reflection layer 5 is divided into a hexagonal picture element. The boundary of a region divided by the conductive transparent electrode 3 agrees with the groove (boundary portions) of the light reflection layer 5 as described in the drawing.

Figure 6:
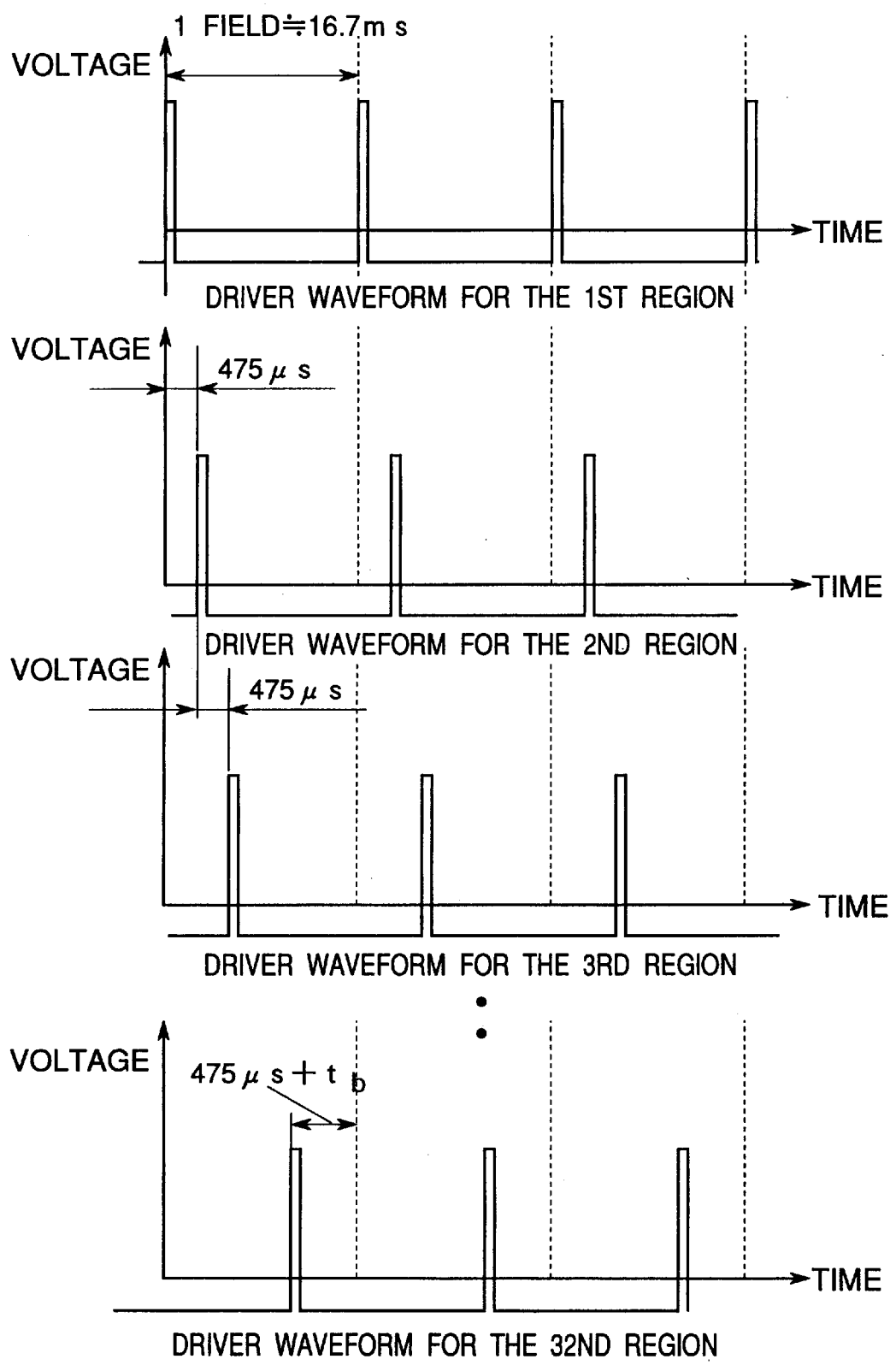
FIG. 6 is a driving signal wave form chart of the OASLM constructed in one embodiment of the invention.

Numerals 1 through 32 are given to regions in an order where the writing images from the CRT are inputted. FIG. 6 shows the shift of the phase among each driving signals produced by the construction of FIG. 3. Here the images are NTSC signals. Therefore, 1 field period is approximately 16.7 milliseconds. The vertical effective scanning period, except for approximately 1.5 milliseconds of the vertical flyback period from the field period, is approximately 15.2 milliseconds. Namely, the writing (i.e., inputting operation of light signals) starts sequentially from a first region, and finishes to the 32nd region after approximately 15.2 milliseconds. Thus, time required to write one region is approximately 475 micro seconds (=15.2 milliseconds/32). In each region, the erasing pulse is shifted approximately 475 micro seconds.

FIG. 7 shows a driving signal (FIG. 7 (*a*)) in n-th region, a writing light intensity (FIG. 7 (*b*)), and a time response wave form (FIG. 7 (*c*)) of the output of the OASLM. In the upper portion of the region, the writing operation starts a constant time T after the erasing pulse application and the OASLM starts its response. In the lower portion of the region, the writing operation starts, behind approximately 475 micro seconds in maximum. The rising of the OASLM in one region is delayed at most by 475 micro seconds. Therefore, nonuniformity of the lightness of the image within the region is hardly detected. Furthermore, the phase (applying time of the erasing pulse) of each driving signal is shifted by 475 micro seconds as shown in FIG. 6, to apply it upon each region. Thus, the shift T of the timing of the erasing pulse and the writing light is almost identical in all the regions. Namely, it is possible to conduct the response shown in FIG. 7 in all the regions and the time aperture factor in all the regions can be almost identical. The time aperture factor can be made higher without losing the uniformity by reducing the shift T of the erasing pulse and the writing light.

There is no need to write by the fluorescent substrate of long afterglow to realize uniform projection. Thus, it is possible to use the fluorescent substrate of having sufficiently short afterglow can be used with respect to the field period, so as to make the afterimage zero.

According to the projecting type image displaying apparatus of this invention, it is possible to satisfy at the same time three points of brightness to be retained, uniformity to be realized, the afterimage to be removed even with respect to all the image signals. This operation will be described with using FIG. 8, wherein $t_f$ is a field period of an image signal, $t_b$ is a vertical flyback period, n is the number of divided portions in the conductive transparent electrode, τ is time required from the application of the erasing signal to the writing start in each region. Also, θ is input light intensity which becomes a boundary as to whether the OASLM starts its response, i.e., a threshold value of the light intensity, and T is time required for the afterglow of the fluorescent substrate of the CRT to attenuate below a threshold or lower in displaying the total white signal.

In the principle of the OASLM of the invention, the writing operation is to start after the erasing application τ in the first region. As one region, time required for the CRT to conduct the writing operation is expressed by a (equation 1). The phase of the driving signal to be applied to each region is shifted sequentially by t, so as to drive each region.

$$t=(t_f-t_b)/n(=475 \text{ micro seconds}) \quad \text{(Equation 1)}$$

Since the writing operation usually starts in each region after the erasing pulse application by τ giving the phase difference to the driving signal to each region in this manner, the nonuniformity for each region becomes removed completely in principle.

Nonuniformity within the region is taken into consideration. Although the writing operation starts after the erasing pulse application τ in the upper portion of each region, the writing operation is conducted, further delayed by t in the lower portion. But when the number n of divided portions increases, the writing delay time t becomes smaller with respect to $t_f$, and the nonuniformity within the region becomes difficult to be conspicuous. Since the response speed of the OASLM can be made gradually fast by making the writing light intensity stronger from the upper portion of the region to the lower portion, it is possible to make the nonuniformity smaller. In this manner, it can be realize the uniform projection of the whole image.

At this time, it is possible to get the time aperture factor closer to 100% when the τ is made smaller as much as possible, and the bright image displaying operation can be realized. Preferably the τ can satisfy at least (equation 2).

$$\tau < t_f/2 \quad \text{(Equation 2)}$$

By the aforementioned principle, high brightness image projection and high uniformity in brightness of the image can be achieved at the same time. In this case, it is feared that the afterimage is generated, but the problem can be selected by making the afterglow of the fluorescent substrate shorter, i.e., the attenuation of the light emission from the fluorescent substrate acute. When the attenuation time T for the afterglow of the fluorescent substrate to be attenuated to θ or lower in the displaying operation of the total white signal satisfies the (equation 3), the signal of the former field does not affect the next field and the afterimage becomes zero.

$$T < T_f - \tau - (t_f - t_b)/n \quad \text{(Equation 3)}$$

Here the concrete numeral values of T, τ, a in the (equation 3) are introduced briefly. Generally the attenuation of the light emission brightness B (t) of the fluorescent substrate used in the CRT is expressed by a (equation 4). In the (equation 4), $B_0$ is initial brightness after the address by the electron beam, a is time constant inherent to the fluorescent substrate.

$$B(t)=B_0\ exp(-t/a) \quad \text{(Equation 4)}$$

When the threshold value θ is defined as brightness of 10% of the initial value $B_0$, the attenuation time T where the light emitting brightness B (t) becomes θ (=0.1 $B_0$) or lower is approximately 5 ms in the case of CRT to be used in the embodiment. The time constant a of the fluorescent substrate becomes (equation 5). Also, the (equation 6) is obtained from the (equation 3).

$$0.1B_0=B_0\ exp(-5\times10^{-3}/a)\ \therefore a=2.172\ ms \quad \text{(Equation 5)}$$

$$\tau<t_f-(t_f-t_b)/n-T\ \therefore \tau<11.19\ ms \quad \text{(Equation 6)}$$

Also, although each region divided can be regarded respectively as an independent OASLM, all the impedance of each region is not necessary identical. Namely, even when the driving operation is conducted with the identical voltage wave form, voltages to be applied effectively upon the photoconductive layer and the light modulating layer are sometimes different somewhat. The reflection factor and the aperture factor of the light reflection layer can be made disperse. As a result, threshold value, τ characteristics, light modulating efficiency and contrast are different depending upon the place for each reflection layer. In this case, the dispersion in each region can be controlled to the detection limit or lower by optimizing the peak to peak value of the erasing pulse or writing pulse, and the impression period of the erasing pulse for each of regions.

By the aforementioned principle, the image displaying which is bright, uniform and afterimage free can be realized through the construction of the projection type image displaying apparatus by the use of the OASLM 1 in this embodiment.

It is possible to provide the image displaying operation of full color by further addition of two units of the projection type image displaying apparatus, except for the light source 11, to the projection type image displaying apparatus shown in FIG. 2, and through composition, on the screen, of the output light of the projection lens of three units in total by adding a color-dividing means for dividing the reading light 12 into three primary colors. By adding the color composing means in the construction, it is possible to conduct the full color image displaying simply by one projection lens 15.

(Embodiment 2)

Figure 9:
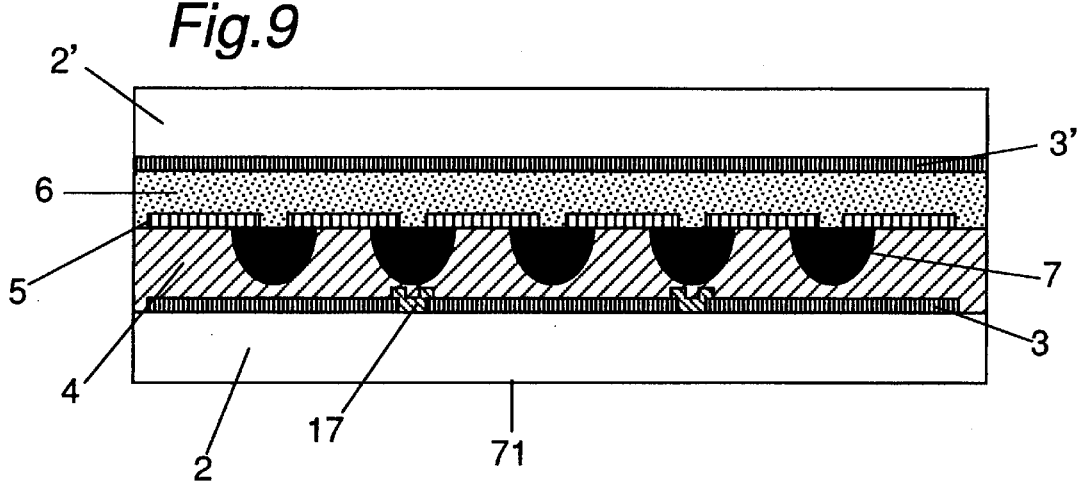
FIG. 9 is a sectional view of the OASLM constructed in one embodiment of the invention.

FIG. 9 is a sectional view of a OASLM 71 in a second embodiment of the invention. In the OASLM 71 of this embodiment, electric crosstalk between regions can be reduced by formation of the insulating layer 17 between each region of the divided conductive transparent electrode 3. As inorganic oxide such as silicon oxide ($SiO_x$), aluminum oxide ($Al_2O_3$), tantalum oxide ($TaO_x$), silicon nitride ($SiN_x$) or the like, inorganic nitride, highly polymerized material such as polyimide system, polyamide system, acrylic system or the like, can be used as an insulating layer.

By using the OASLM 71 in this embodiment, a projection type image displaying apparatus shown in FIG. 2 is constructed. By conducting a driving operation so that the writing light may be inputted immediately after the erasing pulse application, with the phase of the erasing pulse of each driving signal being out of place for each region, as in the embodiment 1, uniform, after-image-free image displaying can be realized without losing the brightness.

(Embodiment 3)

Figure 10:
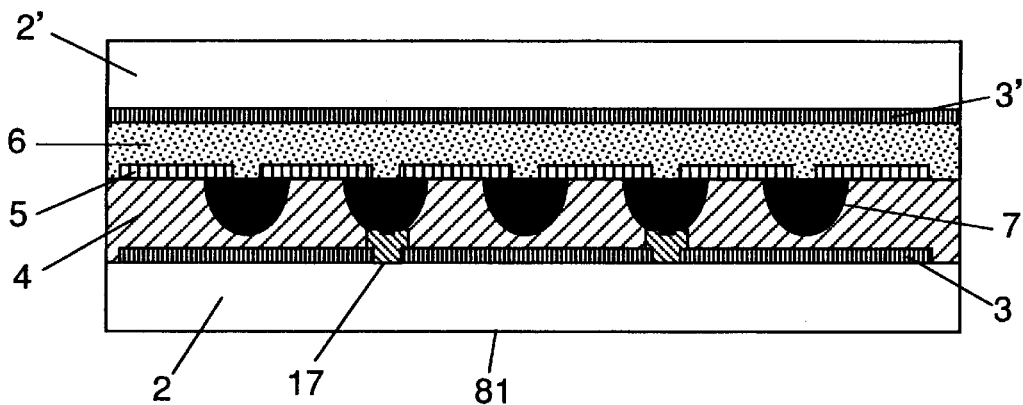
FIG. 10 is a sectional view showing the OASLM constructed in one embodiment of the invention.

FIG. 10 shows a sectional view of a OASLM 81 in the third embodiment of the invention. In the OASLM of this embodiment, the electric crosstalk between regions can be reduced by forming an insulating layer 17 between regions of the divided conductive transparent electrode 3, and by deep-etching of the photoconductive layer 4. By formation of the light preventing layer (not shown) in a groove between the light reflection layer 5, the electric crosstalk between regions can be reduced even when one portion of the reading light is adapted to be prevented from being leaked into the reverse face of the OASLM 81.

By using the OASLM 81 in this embodiment, a projection type image displaying apparatus can be constructed. Bright, uniform, after-image-free image displaying operation can be realized, by conducting a driving operation so that the writing light may be inputted immediately after the erasing pulse application, with the phase of the erasing pulse of each driving signal being out of place for each region.

(Embodiment 4)

Figure 11:
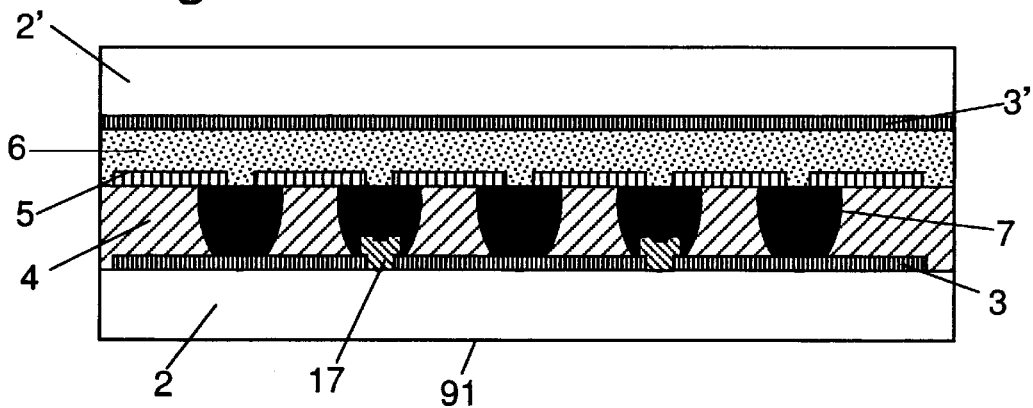
FIG. 11 is a sectional view of the OASLM constructed in one embodiment of the invention.

FIG. 11 shows a sectional view of a OASLM 91 in a fourth embodiment of the invention. In the OASLM of this embodiment, the electric crosstalk between regions can be further reduced by forming an insulating layer 17 between regions of the divided conductive transparent electrode 3, and etching all the photoconductive layers 4. The electric crosstalk between regions can be reduced even when one portion of the reading light is adapted to be prevented from being leaked into the reverse face of the OASLM 1 by formation of the light preventing layer (not shown) into the groove between the light reflection layer 5. But it is necessary to form the insulating layer 17 between the grooves of all the light reflection layers 5 in this case.

By using the OASLM in this embodiment, a projection type image displaying apparatus can be constructed. Bright, uniform, and after-image-free image displaying operation can be realized by conducting a driving operation so that the storing light may be inputted immediately after the erasing pulse application, with the phase of the erasing pulse being out of place for each region.

(Embodiment 5)

Figure 12:
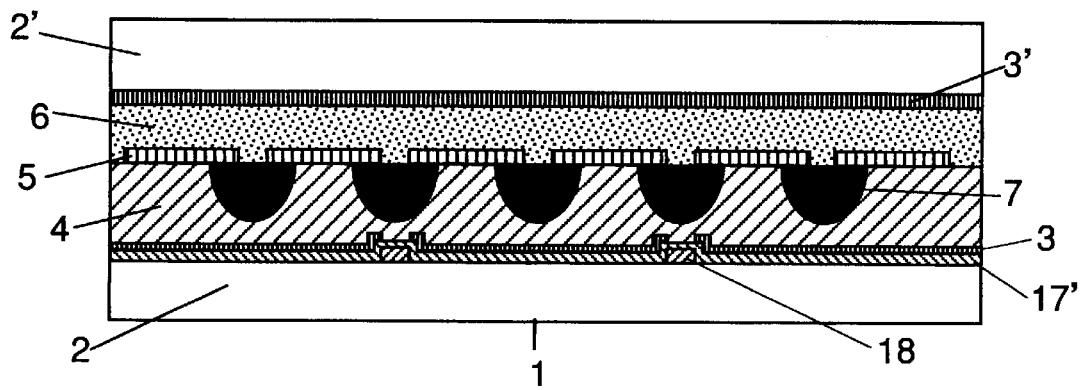
FIG. 12 is a sectional view of the OASLM constructed in one embodiment of the invention.

FIG. 12 shows a sectional view of a OASLM 101 in a fifth embodiment of the invention. In the OASLM 101 in the embodiment, a light reflection or light absorbing light-preventing layer 18 is formed between the regions of the divided conductive transparent electrode 3. When the light preventing layer 18 is conductive, an insulating layer 17' for electrically separating the conductive transparent electrode 3 and the light preventing layer 18 is formed, and then the conductive transparent electrode 3 is filmed.

The electric crosstalk between regions which is caused due to low resistance of the photoconductive layer 4 can be reduced by the application of the writing light through such construction. The metal such as aluminum, chromium, titanium, or these oxides, or nitrides, or a light absorbing material or the like which can disperse the black pigment or the coloring matter molecule such as carbon particle or the like with respect to a base material of a highly polymerized material such as acrylic system, polyimide system, polyamide system or the like having absorbing performance to the wave length higher in sensitivity of the dielectric mirror laminated with dielectric or photoconductive layer 4, can be used as the light preventing layer.

Also, although the insulating layer 17' is desirable to be transparent to the writing light when the insulating layer is formed on the whole face of the glass substrate 2, it may be formed only between regions of the conductive transparent electrodes.

(Embodiment 6)

Figure 13:
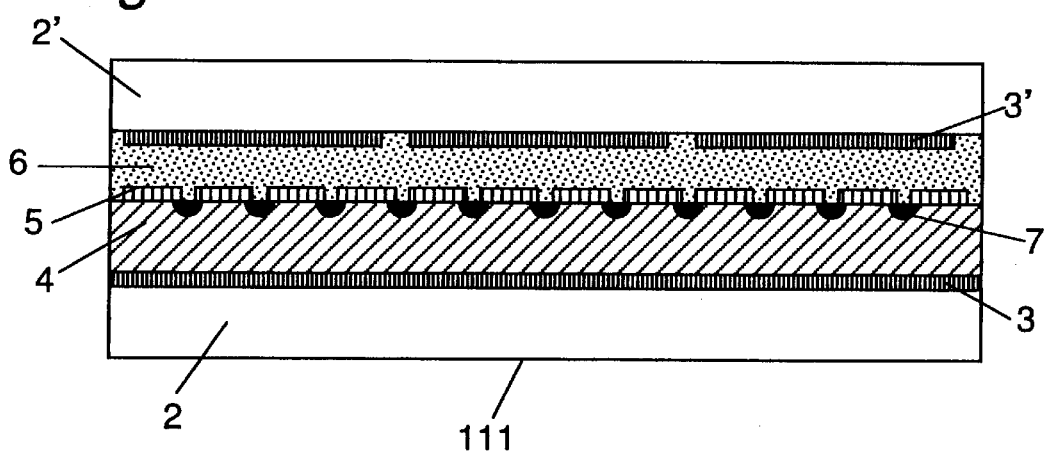
FIG. 13 is a sectional view of the OASLM constructed in one embodiment of the invention.

FIG. 13 shows a sectional view of a OASLM 111 in a sixth embodiment of the invention. In the OASLM, a conductive transparent electrode 3, a photoconductive layer 4, a light reflection layer 5 are formed on the glass substrate 2, and a light absorbing layer 7 is formed after the formation of the groove construction through etching of the photoconductive layer 4 between the light reflection layer 5. The light modulating layer 6 is grasped by the glass substrate 2' with these layers and the conductive transparent electrode 3' being formed. One portion of the reading light can be prevented from being leaked to the reverse face of the OASLM 111 by the formation of the light preventing layer (not shown) in the groove interval between the light reflection layer 5.

In the OASLM 111 of this embodiment, the conductive transparent electrode 3' is divided into 32 belt-like regions parallel to the scanning line of the input image and the driving signals are applied from both the ends of each region. In this embodiment, a light reflection layer 5 is divided into a hexagonal picture element. The boundary of a region divided by the conductive transparent electrode 3' as in the (embodiment 1) agrees with the groove (boundary portion) of the light reflection layer 5.

The projection type image displaying apparatus using the OASLM 111 of this embodiment, which is operated so that the writing light is inputted immediately after the erasing pulse application, and shifting the phase of each erasing pulse as shown in the (embodiment 1), an project bright, uniform and after-image-free image.

(Embodiment 7)

Figure 14:
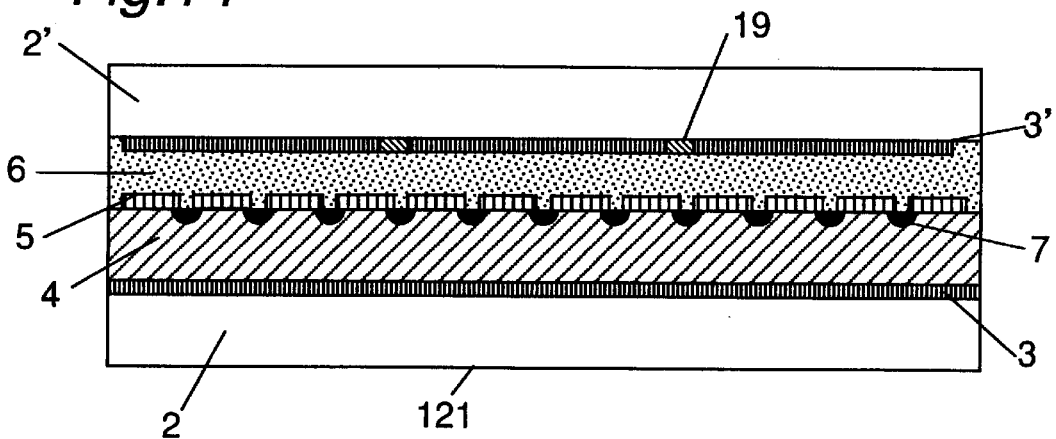
FIG. 14 is a sectional view of the OASLM constructed in one embodiment of the invention.

FIG. 14 is a sectional view of a OASLM 121 in a seventh embodiment of the invention. In the OASLM of the embodiment, an insulating layer 19 is formed between the regions of the conductive transparent electrode 3' divided as in the embodiment 7 and the electric crosstalk between the regions is reduced. As an insulating layer, inorganic oxide or inorganic nitride such as silicon oxide ($SiO_x$), aluminum oxide ($Al_2O_3$), tantalum oxide ($TaO_x$), silicon nitride ($SiN_x$) or the like, a light absorbing insulating layer of highly polymerized material such as acrylic system, polyimide system, polyamide system or the like where black pigments or coloring matter molecules such as carbon particles are scattered or a light reflection insulating layer of praseodymium manganese oxide or the like is preferable to be used.

The projection type image displaying apparatus using the OASLM 121 of this embodiment which is operated so that the writing light is inputted immediately after the erasing pulse application, and shifting the phase of each erasing pulse for each region, can project bright, uniform and after-image-free image.

(Embodiment 8)

Figure 15:
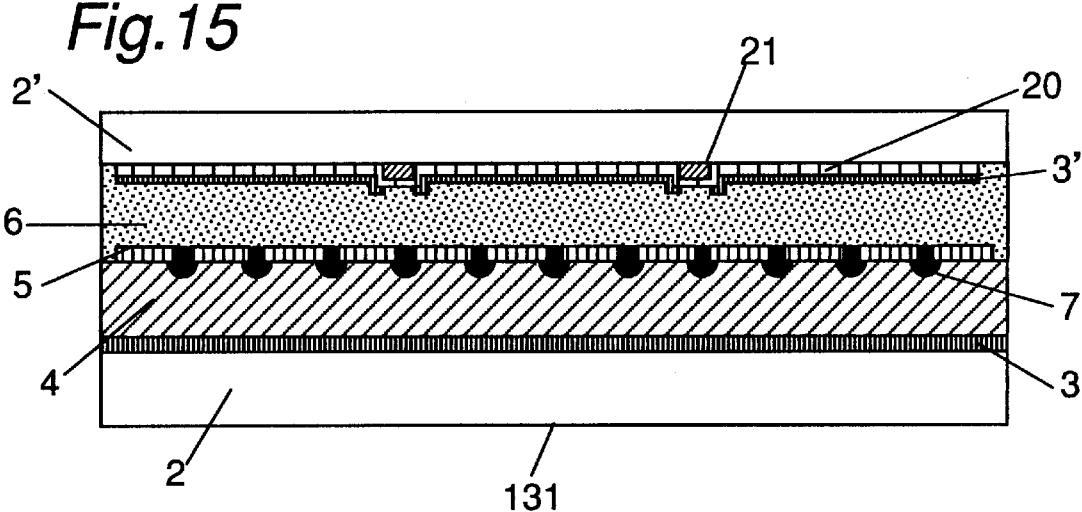
FIG. 15 is a sectional view of the OASLM constructed in one embodiment of the invention.

The sectional view of the OASLM 131 of an eighth embodiment of this invention is shown in FIG. 15. In the OASLM 131 of the embodiment, a transparent insulating layer 20 is formed between the glass substrate 2' on the light modulating layer side and the divided conductive transparent electrode 3'. A conductive layer 21 having light reflecting property and/or light absorbing property is formed not to come into contact with the light modulating layer 6 and the conductive transparent electrode 3' by the construction of the transparent insulating layer 20 as shown in FIG. 15. The boundary portion between the regions is adapted to be darkened.

The projection type image displaying apparatus using the OASLM 131 of this embodiment which is operated so that the writing light is inputted immediately after the erasing pulse application, and shifting the phase of each erasing pulse for each region, can project bright, uniform and after-image-free image.

(Embodiment 9)

Figure 16:
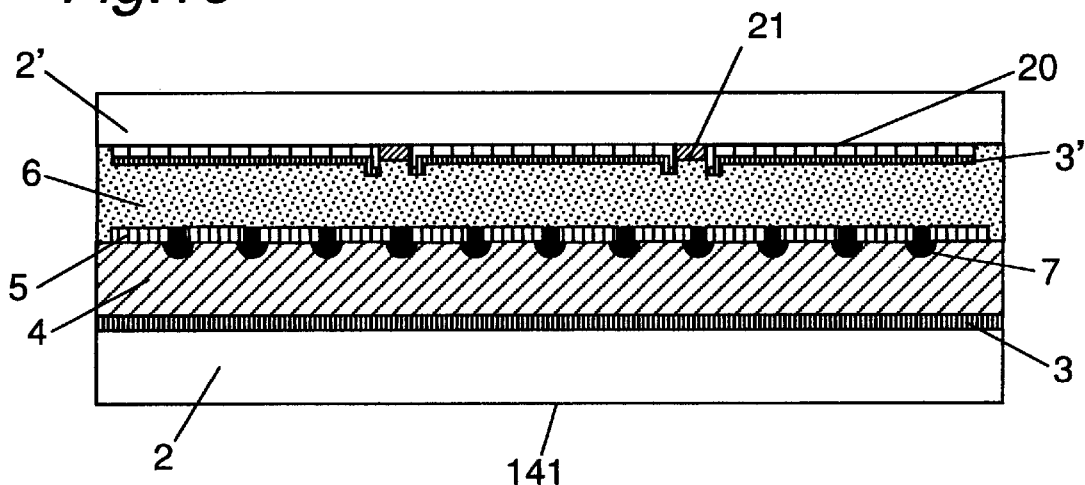
FIG. 16 is a sectional view of the OASLM constructed in one embodiment of the invention.
Figure 17:
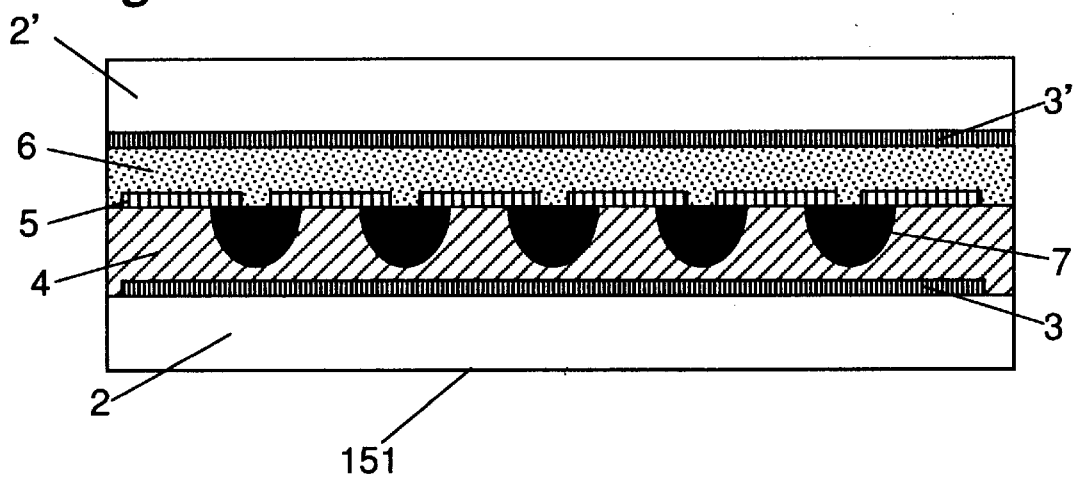
FIG. 17 is a sectional view of a conventional OASLM.

The sectional view of the OASLM 141 is shown in a ninth embodiment of this invention in FIG. 16. In the OASLM of the embodiment, a transparent insulating layer 20 is formed between the glass substrate 2' on the light modulating layer side and the divided conductive transparent electrode 3'. A conductive layer 21 transparent to the reading light is formed to come into contact with light modulating layer 6 but not to come into contact with the conductive transparent electrode 3' by the construction of the transparent insulating layer 20 as shown in FIG. 16. The light modulating layer between regions is driven by making the conductive layer 21 the same in electrode potential as that of the conductive transparent electrode 3' in either of the adjacent regions. Since the light modulating layer 6 of the boundary portion between the regions is operated similarly to either of the adjacent regions by aforementioned construction, the boundary portion can be made less conspicuous.

The projection type image displaying apparatus using the OASLM 141 of this embodiment, which is operated so that the writing light is inputted immediately after the erasing pulse application, and shifting the phase of each erasing pulse for each region, can project bright, uniform and after-image-free image.

This invention can be varied variously in accordance with the summary of the invention and is not restricted to the above construction.

Industrial Applicability

According to the invention as described above, a projection type image displaying apparatus which can project bright, uniform, extremely less after-image-free image can be provided.

What is claimed is:

1. A projection type image displaying apparatus, comprising:

a OASLM (1) for grasping at least a photoconductive layer (4), a light reflection layer (5) and a light modulating layer (6) by a first glass substrate (2) with a first conductive transparent electrode (3) provided on it, and a second glass substrate (2') with a second conductive transparent (3') provided on it, an image source (8) for displaying images inputted into the OASLM (1) by a time serial scanning operation, a driving signal generating means (40) for supplying to the OASLM (1) a driving signal having a frequency approximately identical to the vertical scanning frequency of the image, wherein at least either of the first conductive transparent electrode (3) on the side of the photoconductive layer (4) and the second conductive transparent electrode (3') on the side of the light modulating layer (6) is divided into a plurality of regions, the driving signal to be generated from the driving signal generating means (40) is composed of a plurality of signals different in phase, a signal to be fed respectively to a region adjacent to the first conductive transparent electrode (3) divided or the second conductive transparent electrode (3') has a phase difference approximately equal to the vertical effective scanning period divided by the number of the regions, which is obtained by removing the vertical flyback period from the vertical scanning period.

2. A projection type image displaying apparatus according to claim 1, wherein each of the driving signals is composed of an erasing signal for initializing the OASLM (1), and a writing signal to be impressed a period where the image is inputted into the OASLM, time τ to the start of the image inputting after the impression of the erasing pulse is a half or lower of a vertical scanning period in each region of the divided first or second conductive transparent electrode.

3. A projection type image displaying apparatus according to claim 1,
wherein the OASLM (1) is varied in threshold value in accordance with light intensity to be inputted to the photoconductive layer (4), the light intensity of the image to be inputted to the OASLM (1) is attenuated into an approximately monotone as the time passes after the scanning operation, and time T necessary for the light intensity to attenuate, in displaying the total white signal, to the threshold value, where the OASLM responds, or lower satisfies $$T < t_f - \tau - (t_f - t_b)/n$$

wherein $t_f$ is a vertical scanning period, $t_b$ is a vertical flyback period, τ is time necessary for starting the image input after the impression of the erasing pulse, n is the number of divided portions in the first or second conductive transparent electrode.

4. A projection type image displaying apparatus according to claim 1,
wherein at least either of the peak to peak value of the erasing pulse or the writing signal, or the impression period of the erasing pulse with respect to at least one region among a plurality of divided regions of the first or second conductive transparent electrode is different from that of another region.

5. A projection type image displaying apparatus according to claim 1,
wherein CRT is used in one portion of the image source (8).

6. A projection type image displaying apparatus according to claim 1,
wherein a liquid crystal displaying apparatus is used in one portion of the image source (8).

7. A projection type image displaying apparatus according to claim 1,
wherein a laser light generating means, and a scanning means for scanning the output light from the laser light generating means is used in one portion of the image source (8).

8. A projection type image displaying apparatus according to claim 1,
wherein the light reflection layer (5) is divided into a plurality of picture elements.

9. A projection type image displaying apparatus according to claim 1,
wherein the first conductive transparent electrode (3) is divided in approximately parallel to the scanning line of the inputting image.

10. A projection type image displaying apparatus according to claim 1,
wherein the light reflection layer (5) is divided into a plurality of picture elements, and a boundary where the first conductive transparent electrode (3) is divided approximately agrees with one portion of the boundary to be divided of the light reflection layer (5).

11. A projection type image displaying apparatus according to claim 1,
wherein a first insulating layer (17) is provided on a boundary portion where the first conductive transparent electrode (3) is divided.

12. A projection type image displaying apparatus according to claim 1,
wherein a light preventing layer (18) for preventing one portion of the light to be inputted into the photoconductive layer (4) is provided on the boundary portion where the first conductive transparent electrode (3) is divided.

13. A projection type image displaying apparatus according to claim 12,
wherein the light preventing layer (18) has a conductive property, a second insulating layer (17') for electrically insulating the light preventing layer (18) from the first conductive electrode (3) is provided between the light preventing layer (18) and the first conductive transparent electrode (3).

14. A projection type image displaying apparatus according to claim 1,
wherein the thickness of the photoconductive layer (4) stays within 100 times of the thickness of the first conductive transparent electrode (3).

15. A projection type image displaying apparatus according to claim 1,
wherein the number of the regions where the first conductive transparent electrode (3) is divided is 2 or more and 2000 or less.

16. A projection type image displaying apparatus according to claim 1,
wherein a driving signal is impressed from both the ends of a region corresponding to the scanning line where the image is displayed, of each region where the first conductive transparent electrode (3) is divided.

17. A projection type image displaying apparatus according to claim 1,
wherein the second conductive transparent electrode (3') is divided in approximately parallel to the scanning line of the inputting image.

18. A projection type image displaying apparatus according to claim 1,
wherein the light reflection layer (5) is divided into a plurality of picture elements, and the boundary where the second conductive transparent electrode is divided approximately agrees with one portion of the boundary where the light reflection layer (5) is divided.

19. A projection type image displaying apparatus according to claim 1,
wherein a third insulating layer (19) is provided in the boundary portion where the second conductive transparent electrode (3') is divided.

20. A projection type image displaying apparatus according to claim 19,
wherein the third insulating layer (19) has a light absorbing property.

21. A projection type image displaying apparatus according to claim 19,
wherein the third insulating layer (19) has a light absorbing property.

22. A projection type image displaying apparatus according to claim 1,
wherein a conductive layer (21) is provided in the boundary portion where the second conductive transparent electrode (3') is divided, a fourth insulating layer (20) for electrically insulating the second conductive transparent electrode (3') and the conductive layer (21) is provided between the conductive layer (21) and the second conductive transparent electrode (3').

23. A projection type image displaying apparatus according to claim 22,
wherein the conductive layer (21) has a light absorbing property.

24. A projection type image displaying apparatus according to claim 22,
wherein the conductive layer (21) has a light absorbing property.

25. A projection type image displaying apparatus according to claim 22,
wherein the conductive layer (21) and the fourth insulating layer (20) are transparent, and a driving signal identical to either of the region adjacent to the second divided conductive transparent electrode (3') is impressed.

26. A projection type image displaying apparatus according to claim 1,
wherein the number of the regions where the second conductive transparent electrode (3) is divided is 2 or more and 2000 or less.

27. A projection type image displaying apparatus according to claim 1,
wherein a driving signal is impressed from both the ends of a region corresponding to the scanning line where the image is displayed within each region where the second conductive transparent electrode (3') is divided.

* * * * *